US009239973B1

(12) United States Patent
Kurihara

(10) Patent No.: US 9,239,973 B1
(45) Date of Patent: Jan. 19, 2016

(54) IMAGE FORMING APPARATUS AND NON-TRANSITORY COMPUTER READABLE MEDIUM STORING PROGRAM

(71) Applicant: FUJI XEROX CO., LTD., Tokyo (JP)

(72) Inventor: Yusaku Kurihara, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/613,507

(22) Filed: Feb. 4, 2015

(30) Foreign Application Priority Data

Sep. 11, 2014 (JP) ................................ 2014-185479

(51) Int. Cl.

| | |
|---|---|
| ***G06F 15/00*** | (2006.01) |
| ***G06K 1/00*** | (2006.01) |
| ***G06K 15/00*** | (2006.01) |
| ***G06K 15/16*** | (2006.01) |
| ***G06K 15/02*** | (2006.01) |

(52) U.S. Cl.
CPC ............ *G06K 15/16* (2013.01); *G06K 15/1809* (2013.01)

(58) Field of Classification Search
USPC .................................................. 358/1.1–1.18
See application file for complete search history.

(56) References Cited

U.S. PATENT DOCUMENTS 8,170,431 B2 * 5/2012 Amano ........................... 399/45
9,041,958 B2 * 5/2015 Kishimoto et al. .......... 358/1.15

FOREIGN PATENT DOCUMENTS

JP 2010-245875 A 10/2010
JP 2012-058817 A 3/2012

* cited by examiner

*Primary Examiner* — Douglas Tran
(74) *Attorney, Agent, or Firm* — Sughrue Mion, PLLC

(57) ABSTRACT

An image forming apparatus includes: an image forming section that receives print data and forms an image on a sheet; a stacking section that stacks the sheet on which the image is formed by the image forming section; and a notification section that issues notification prompting the user to change orientation of the sheet stacked on the stacking section in the case where an output mode, by which the sheet with the image formed thereon by the image forming section is outputted onto the stacking section, is changed between the sheet and a next sheet, wherein the notification section determines a change of the output mode based on any one of a sheet output orientation that is an orientation in outputting the sheet, on which the image is formed, onto the stacking section and a printing orientation that is an orientation in forming the image on the sheet.

8 Claims, 15 Drawing Sheets

| OUTPUT PATTERN | SHEET SIZE | SHEET OUTPUT ORIENTATION | PRINTING ORIENTATION | LAYOUT ON OUTPUT SHEET STACKING PART 52 |
|---|---|---|---|---|
| FIRST PATTERN | A4 | LONG-SIDE SHEET OUTPUT | NORMAL ORIENTATION |   |
| SECOND PATTERN | A3 | SHORT-SIDE SHEET OUTPUT | NORMAL ORIENTATION |   |
| THIRD PATTERN | A4 | LONG-SIDE SHEET OUTPUT | REVERSE ORIENTATION |   |
| FOURTH PATTERN | A3 | SHORT-SIDE SHEET OUTPUT | REVERSE ORIENTATION |   |

S2
S1
A

S2
S1
A

S3
S2
S1
A

S2
S1
A

S2
S1
A

S3
S2
S1
A

IMAGE FORMING APPARATUS AND NON-TRANSITORY COMPUTER READABLE MEDIUM STORING PROGRAM

CROSS REFERENCE TO RELATED APPLICATION

This application is based on and claims priority under 35 USC §119 from Japanese Patent Application No. 2014-185479 filed Sep. 11, 2014.

BACKGROUND

1. Technical Field

The present invention relates to an image forming apparatus and an image forming method.

2. Related Art

There are known image forming apparatuses and the like that output sheets, on each of which an image is formed, in output patterns corresponding to sheet sizes or image orientations.

SUMMARY

According to an aspect of the present invention, there is provided an image forming apparatus including: an image forming section that receives print data and forms an image on a sheet; a stacking section that stacks the sheet on which the image is formed by the image forming section; and a notification section that issues notification prompting the user to change orientation of the sheet stacked on the stacking section in the case where an output mode, by which the sheet with the image formed thereon by the image forming section is outputted onto the stacking section, is changed between the sheet and a next sheet, wherein the notification section determines a change of the output mode based on any one of a sheet output orientation that is an orientation in outputting the sheet, on which the image is formed, onto the stacking section and a printing orientation that is an orientation in forming the image on the sheet.

BRIEF DESCRIPTION OF THE DRAWINGS

Exemplary embodiments of the present invention will be described in detail based on the following figures, wherein:

FIGS. 5A-1 to 5A-4 each shows a sheet stacked onto an output sheet stacking part in a related art different from the exemplary embodiment.

FIGS. 13A-1 to 13A-3 show states of sheets in a fourth exemplary embodiment, and FIGS. 13B-1 to 13B-3 show states of sheets in a fifth exemplary embodiment.

DETAILED DESCRIPTION

Hereinafter, an exemplary embodiment according to the present invention will be described in detail with reference to attached drawings.

First Exemplary Embodiment

<Image Forming System 1>

Figure 1:
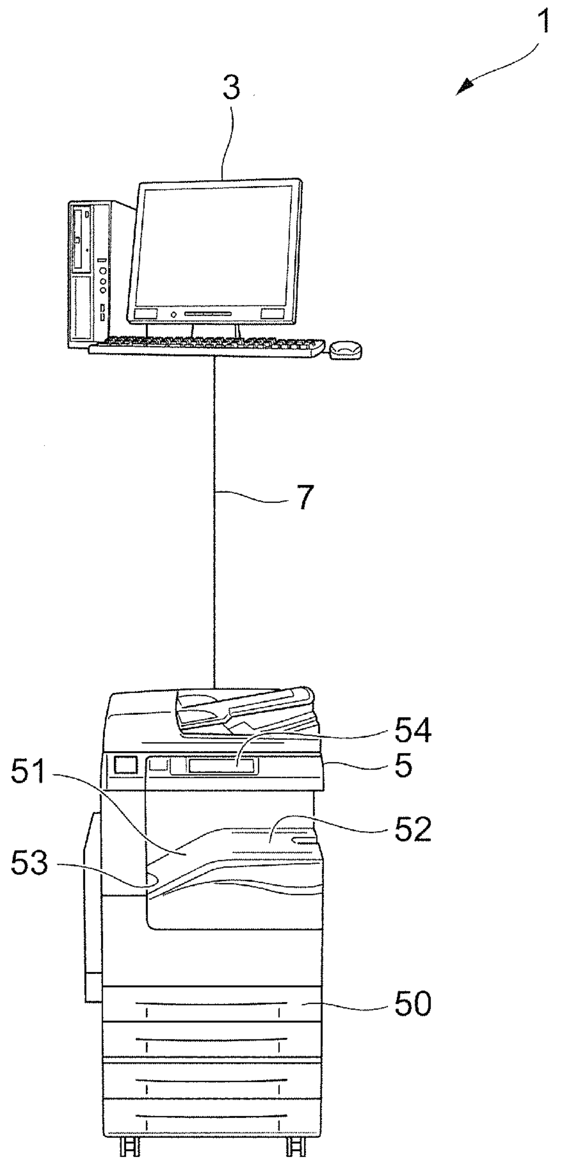
FIG. 1 shows a configuration example of an image forming system to which a first exemplary embodiment is applied.

FIG. 1 shows a configuration example of an image forming system 1 to which the exemplary embodiment is applied.

As shown in FIG. 1, the image forming system 1 is configured by connecting a terminal device 3 and an image forming apparatus 5 via a network 7.

The terminal device 3 is a computer device that provides an instruction of printing to the image forming apparatus 5. Here, as the terminal device 3, for example, a PC (Personal Computer) may be used. In this case, the PC may be one that operates as a client PC or one that operates as a server PC. Moreover, the terminal device 3 may be, for example, a tablet, a mobile terminal and the like. It should be noted that, in the example shown in the figure, the single terminal device 3 is connected to the image forming apparatus 5; however, plural terminal devices 3 may be connected thereto as another example.

The image forming apparatus 5 has an image forming function (printing function) that forms an image onto a medium, such as a sheet. As the image forming apparatus 5, use of a so-called multifunction machine that has, other than the image forming function, for example, an image reading function to read an image from a medium, such as a sheet, or a facsimile function can be exemplified.

It should be noted that, in the example shown in the figure, the image forming apparatus 5 includes a supply sheet stacking part (tray) 50 in which sheets for forming images are stacked, an output sheet stacking part 52 which is provided with an inclined surface 51 and on which sheets, on each of which an image is formed (outputted sheets), are stacked, and an abutting wall 53 which is abutted by an edge portion of a sheet falling along the inclined surface 51 to align the edge portions of the sheets. Moreover, the image forming apparatus 5 includes a UI 54 that is configured with a display panel, accepts an instruction from a user and displays a message or the like to a user. It should be noted that the output sheet stacking part 52 is an example of a stacking part.

The network 7 is a communication line network used for performing information communication between the terminal device 3 and the image forming apparatus 5. Here, as the network 7, use of a LAN (Local Area Network), the Internet, a wireless system or near field communication can be exemplified.

<Configuration Example of Image Forming System 1>

Figure 2:
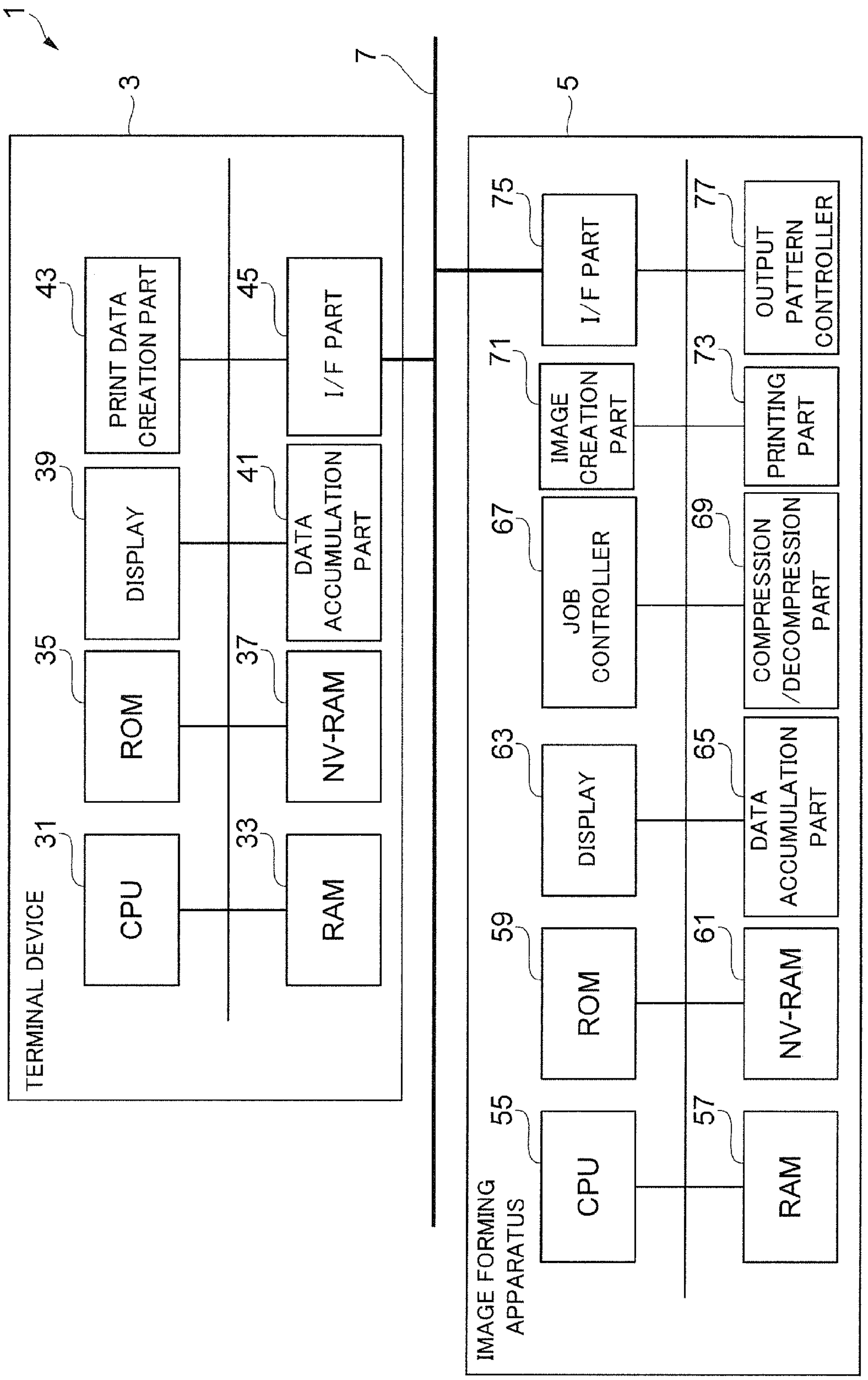
FIG. 2 shows a functional configuration example of the image forming system to which the first exemplary embodiment is applied.

FIG. 2 shows a functional configuration example of the image forming system 1 to which the exemplary embodiment is applied.

Next, with reference to FIG. 2, the configuration of the image forming system 1 will be described.

As shown in FIG. 2, the terminal device 3 includes a CPU (Central Processing Unit) 31, a RAM (Random Access Memory) 33, a ROM (Read Only Memory) 35, an NV-RAM (Non-Volatile RAM) 37, a display 39, a data accumulation part 41, a print data creation part 43 and an I/F (interface) part 45.

The CPU 31 executes various kinds of software, such as an OS (Operating System) or application.

The RAM 33 is a memory used as a working memory for the CPU 31 or the like.

The ROM 35 is a memory for storing the various kinds of programs executed by the CPU 31.

The NV-RAM 37 is a non-volatile memory that is rewritable and is able to reserve data in a case where electric power supply is unavailable, to thereby store various kinds of setting information necessary to operate the terminal device 3.

The display 39 displays information to be known to a user on a display device such as a display (not shown).

The data accumulation part 41 is a storage region, such as a magnetic disk device, that stores data inputted to various kinds of software or data outputted from various kinds of software.

The print data creation part 43 creates print data to provide instructions for printing by the image forming apparatus 5 or the like.

The I/F part 45 transmits and receives data to and from other devices, such as the image forming apparatus 5, via the network 7.

Moreover, the image forming apparatus 5 includes a CPU (Central Processing Unit) 55, a RAM (Random Access Memory) 57, a ROM (Read Only Memory) 59, an NV-RAM (Non-Volatile RAM) 61, a display 63, a data accumulation part 65, a job controller 67, a compression/decompression part 69, an image creation part 71, a printing part 73, an I/F (interface) part 75 and an output pattern controller 77.

The CPU 55 loads various kinds of programs stored in the ROM 59 or the like into the RAM 57 to execute thereof. For example, the CPU 55 implements each function of the output pattern controller 77.

The RAM 57 is a memory used as a working memory for the CPU 55 or the like.

The ROM 59 is a memory for storing the various kinds of programs executed by the CPU 55.

The NV-RAM 61 is a non-volatile memory that is rewritable and is able to reserve data in a case where electric power supply is unavailable, to thereby store various kinds of setting information necessary to image forming operations.

The display 63 displays information to be known to a user on the UI 54 (refer to FIG. 1) or the like, and accepts input operation from a user via an operation panel or the like.

The data accumulation part 65 is a storage region to accumulate, for example, image data or the like received from other devices, such as the terminal device 3, via the network 7.

The job controller 67 accepts a job (a series of image forming operations executed in accordance with printing instructions) received from other devices, such as a terminal device 3, and performs administration of accepted job or image data.

The compression/decompression part 69 performs a compression process on image data accumulated in the data accumulation part 65 and a decompression process on compressed image data.

The image creation part 71, as an example of a suspension unit and an image data creation section, creates an image according to accepted image data. For example, the image creation part 71 analyzes print data of the printing instruction and in accordance with a result of the analysis, performs rasterizing, namely, creates a print image (creation of image data) from the print data.

The printing part 73, as an example of an image forming section, forms an image onto a sheet by, for example, an electrophotographic system that forms an image by transferring toner attached to a photoreceptor onto a sheet or an ink jet system that forms an image by ejecting ink onto a sheet, in accordance with image data analyzed by the image creation part 71.

The I/F part 75 transmits and receives data to and from other devices, such as the terminal device 3, via the network 7.

The output pattern controller 77 determines and controls output patterns in accordance with the print data. The output pattern controller 77 will be described in detail later.

Here, the printing instruction refers to an instruction to let the image forming apparatus 5 execute printing, and includes print data and print settings in addition to a command for executing printing.

The print data is, for example, PDL data described by PDL (Page Description Language). In the print data, designation of a sheet size and orientation of document (also referred to as orientation of original in some cases) per each page is included. Moreover, in the print data, an image quality instruction that is an instruction related to image quality, such as resolution, tone information and screen, and a drawing command that is a drawing order of a character, figure, image and the like are included.

The print settings are settings in performing printing on a sheet in accordance with the print data and include, for example, designation of image quality such as high image quality or normal image quality, designation of a color mode, such as multicolor or monochrome, designation of a duplex mode for performing double-sided printing, designation of an N-up mode for forming plural (N) images on a single sheet, or designation of a booklet mode for performing printing in a state of a booklet.

The sheet size refers to dimensions of a sheet prescribed by Industrial Standards or the like, and for example, there are A3 size, A4 size and the like (hereinafter, referred to as A3, A4 and the like in some cases).

The document orientation refers to orientation of an image formed on a sheet, which includes, for example, a portrait-orientation document and a landscape-orientation document. Here, the portrait-orientation document is a document arranged in a state in which the document (image) is viewed with short sides of the sheet being set on the upper side and the lower side, whereas, the landscape-orientation document is a document arranged in a state in which the document is viewed with short sides of the sheet being set on the left side and the right side. It should be noted that the term document orientation, here, is different from the distinction in character orientation (vertical writing and horizontal writing).

The output pattern (output mode) refers to a mode for outputting a sheet on which an image is formed in accordance with the print data. In the exemplary embodiment, the output pattern is determined by each of the factors of: a sheet size; sheet output orientation; and character printing orientation. It should be noted that a description is given here by taking a case in which the output pattern is determined by a combination of a sheet size, sheet output orientation and character printing orientation as an example; however, determination of the output pattern is not limited to this combination, and may be determined by a factor other than the above-described three, such as a sheet type (for example, a tab sheet or a punched sheet). Moreover, the output pattern may be determined by any one of the sheet size, the sheet output orientation and the character printing orientation or factors other than these, or a combination of plural factors.

The sheet output orientation means orientation of a sheet with reference to a transport direction (sheet output direction) of the sheet, and includes, for example, long-side sheet output or short-side sheet output. Here, the long-side sheet output refers to a state in which a side of a sheet orthogonal to (crossing) the sheet output direction is a long side, whereas, the short-side sheet output refers to a state in which a side of a sheet orthogonal to the sheet output direction is a short side. To additionally describe, the sheet output orientation corresponds to sheet placement orientation in the supply sheet stacking part 50 (refer to FIG. 1). To be specific, in the case of the long-side sheet output, sheets are placed in portrait orientation in the supply sheet stacking part 50, and in the case of the short-side sheet output, sheets are placed in landscape orientation in the supply sheet stacking part 50.

The printing orientation is orientation of an image formed on a sheet with reference to the image forming apparatus 5 (output sheet stacking part 52), and includes, for example, normal orientation and reverse orientation. Here, the normal orientation in the example shown in the figure refers to orientation of an image in which, in a state where a sheet is stacked in the output sheet stacking part 52, an upper side of the image formed on the sheet is arranged on a far side of the image forming apparatus 5 (on a far side of the page of FIG. 1). On the other hand, the reverse orientation is orientation of an image in which an upper side of the image is arranged on a frontward side of the image forming apparatus 5 (on a frontward side of the page of FIG. 1).

<Details of Output Pattern>

Figure 3:
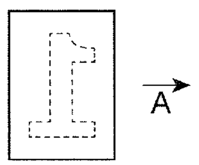
FIG. 3 is a diagram illustrating details of output patterns in the first exemplary embodiment.
Figure 3:
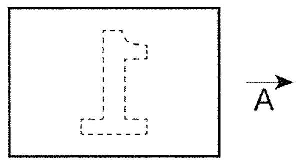
Figure 3:
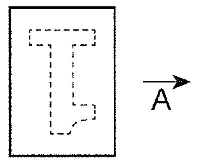
Figure 3:
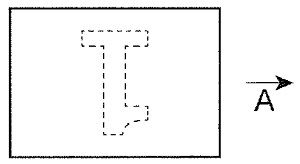

FIG. 3 is a diagram illustrating details of the output patterns in the exemplary embodiment. It should be noted that, in a layout on the output sheet stacking part 52 in FIG. 3, an output direction in which a sheet is outputted to the output sheet stacking part 52 is indicated by arrow A.

Next, with reference to FIG. 3, details of the output patterns in the exemplary embodiment will be described.

First, in the exemplary embodiment, the supply sheet stacking part 50 (refer to FIG. 1) includes plural sheet loading areas. Then, it is assumed that each of the plural sheet loading areas, the A4-size sheets in the landscape orientation, the A4-size sheets in the portrait orientation, and the A3-size sheets in the landscape orientation are placed. This makes it possible to perform both long-side sheet output and short-side sheet output in a case where A4 is designated as the sheet size in the print data, and in a case where the A3 is designated as the sheet size, only short-side sheet output is available. It should be noted that, in this case, the sheet of A3 size is able to be captured as the sheet with limitation in the sheet output orientation.

Moreover, as shown in FIG. 3, in the example shown in the figure, there are a first pattern, a second pattern, a third pattern and a fourth pattern as the output patterns.

Here, in the first pattern, it is assumed that the sheet size is A4, the sheet output orientation is the long-side sheet output, and the printing orientation is the normal orientation. Moreover, in the second pattern, it is assumed that the sheet size is A3, the sheet output orientation is the short-side sheet output, and the printing orientation is the normal orientation. Further, in the third pattern, it is assumed that the sheet size is A4, the sheet output orientation is the long-side sheet output, and the printing orientation is the reverse orientation. Still further, in the fourth pattern, it is assumed that the sheet size is A3, the sheet output orientation is the short-side sheet output, and the printing orientation is the reverse orientation. It should be noted that, in the following description, it is assumed that the first pattern is set in the case of the A4-size sheet, and the second pattern is set in the case of the A3-size sheet, as a default setting.

Moreover, as shown in the layout on the output sheet stacking part 52 in FIG. 3, the sheet placed on the output sheet stacking part 52 is in a state in which a front surface of the sheet (a surface on which an image is formed) cannot be observed from above in the vertical direction of the output sheet stacking part 52, namely, in a face down stacking state. Here, since the sheet is in the face down stacking state, as compared to a case where the front surface of the sheet can be observed from above the output sheet stacking part 52, that is, the sheet is in a face up stacking state, the image formed on the sheet is prevented from being viewed by a person other than the user providing an output instruction of the sheet, and accordingly, confidentiality of information is improved. Moreover, by bringing the sheet into the face down stacking state, as soon as the image forming apparatus 5 receives print data of the first page, it becomes possible to start printing of the first page (described later).

<Mixed Size Processing>

In a job of sequentially forming images onto plural sheets (printing request), plural sheet sizes are designated in some cases. In other words, there are some cases in which forming of a bundle of sheets including plural sheet sizes, namely, a so-called bundle of mixed-size sheets, is desired.

In a related art different from the exemplary embodiment, with respect to the job in which plural sheet sizes are mixed, print data is analyzed in the terminal device 3 so that proper sheet output orientation and printing orientation are applied in some cases. That is, before transmitting the job to the image forming apparatus 5, the sheet sizes and document orientations of all pages (sheets) included in the job are analyzed in the terminal device 3 (a printer driver). Then, the terminal device 3 determines the proper sheet output orientations and printing orientations, reflects the determination result in the print data, and transmits the print data to the image forming apparatus 5. Moreover, at this time, the terminal device 3 obtains sheet sizes supported by the image forming apparatus 5 (sheet sizes in which printing is available) or prohibition conditions from the image forming apparatus 5, and based on this information, the terminal device determines the proper sheet output orientations and printing orientations.

However, in the above-described configuration of the related art, both of the terminal device 3, which is the transmitting side, and the image forming apparatus 5, which is the receiving side, are required to include a mechanism with consideration given to output of plural sheet sizes. Then, for example, in a case where the terminal device 3 does not include the above-described mechanism, or, in a case where direct printing, in which the terminal device 3 directly transmits an electronic document, such as a PDF (Portable Document Format), to the image forming apparatus 5, to thereby execute printing and outputting, is performed, the above-described configuration cannot be applied. Or, in a case where a general-purpose printer driver (for example, AirPrint (registered trademark)) that can be commonly used with respect to any image forming apparatus (not shown) other than the image forming apparatus 5 is used in the terminal device 3, the above-described configuration cannot be applied, too.

Further, in the above-described configuration, to obtain the sheet sizes and document orientations of all pages, it is necessary to analyze the print data once with respect to all pages in the terminal device 3 or image forming apparatus 5. Consequently, printing performance, in particular, the time taken to output the first copy (sheet) after transmitting a command of starting instruction from the terminal device 3 is reduced.

Then, in the exemplary embodiment, the analysis of the print data performed to apply proper sheet output orientations and printing orientations is performed not by the terminal device 3, but by the image forming apparatus 5. Moreover, in the image forming apparatus 5, without waiting for reception of print data of all pages, the print data is successively analyzed from the first page. Then, based on the analyzed print data, each of the pages is successively printed. In other words, in the image forming apparatus 5, in the order of receiving the print data, the page corresponding to the received print data is printed. It should be noted that the image forming apparatus 5 is able to be captured as a configuration capable of starting printing of the first page before reception of the entire print data is completed. Moreover, the mixed-size job described here is able to be captured as an example of a job in which a sheet size of each page is not learned until the print data is successively analyzed.

<Bundle of Mixed-Size Sheets>

Figure 4A:
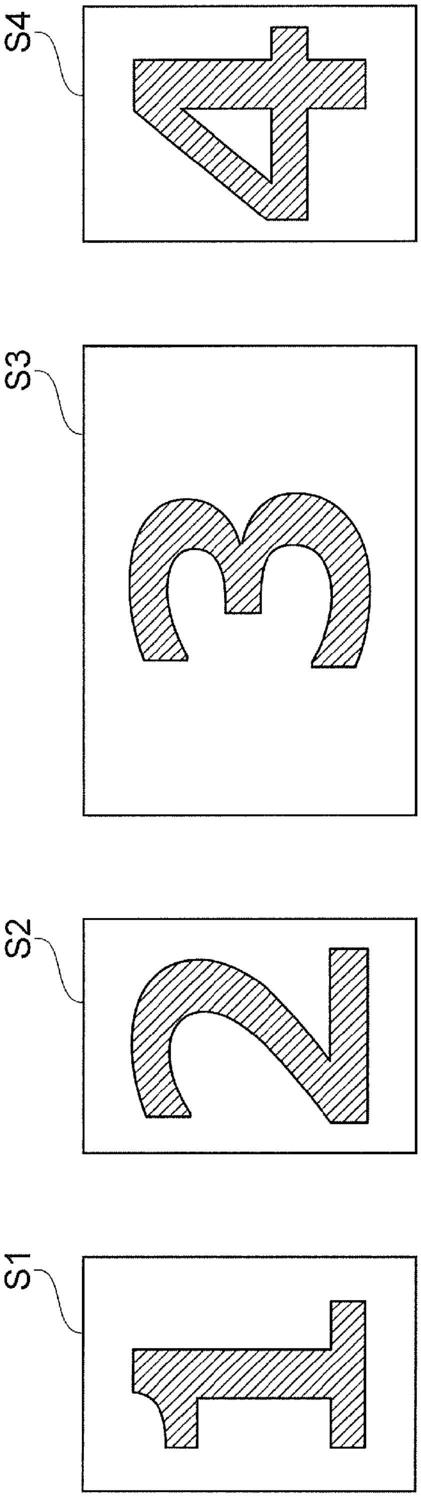
FIG. 4A is a diagram illustrating print data of mixed sizes.
Figure 4B:
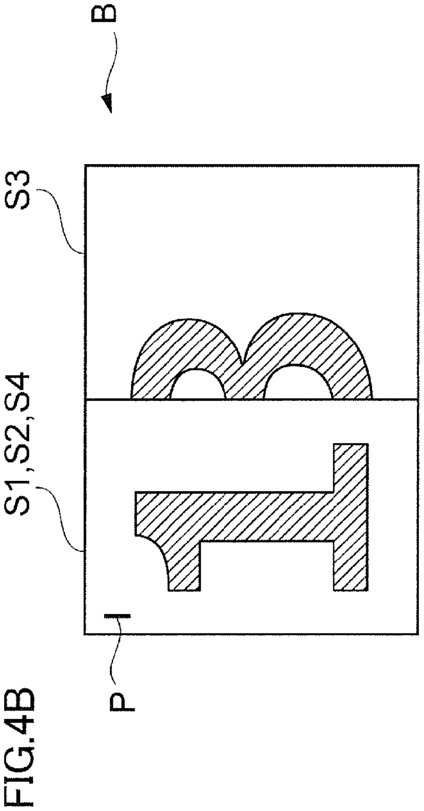
FIG. 4B shows a bundle of sheets that is desired to be formed by the print data shown in FIG. 4A.

FIG. 4A is a diagram illustrating the print data of mixed sizes, and FIG. 4B shows a bundle of sheets B that is desired to be formed by the print data shown in FIG. 4A.

Here, in accordance with the print data shown in FIG. 4A, a mode of forming a bundle of mixed-size sheets will be described.

In other words, in the print data shown in FIG. 4A, the image "1" is formed on the first sheet S1, the image "2" is formed on the second sheet S2, the image "3" is formed on the third sheet S3 and the image "4" is formed on the fourth sheet S4. Here, in the example shown in the figure, it is assumed that the sheet size of the sheets S1, S2 and S4 is A4, and the sheet size of the sheet S3 is A3, which is larger than the sheets S1, S2 and S4. Moreover, the orientation of image in the sheets S1, S2 and S4 is the portrait-orientation document, and the orientation of image in the sheet S3 is the landscape-orientation document.

Then, as shown in FIG. 4B, a bundle of sheets B is formed by the sheets S1, S2, S3 and S4 on each of which the image is formed as shown in FIG. 4A. In other words, in the bundle of sheets B, long sides of the sheets S1, S2 and S4 and a short side of the sheet S3 are aligned. It should be noted that, in the bundle of sheets B, sides positioned on the left side are aligned with the orientation in which the upper side of the image is located upward, and a binding portion P, which is a portion where a binding process is applied by a staple or the like, is formed at the top left corner portion. It should be noted that the description will be given by taking the binding portion P as an example; however, a mode in which the binding process is not applied to the bundle of sheets B may be, of course, available.

Figures 1, 5A:
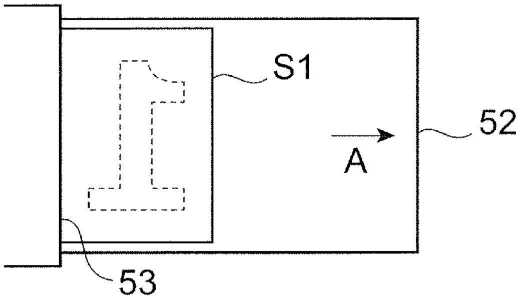
Figures 2, 5A:
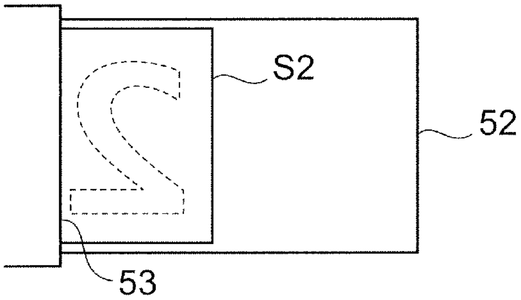
Figures 3, 5A:
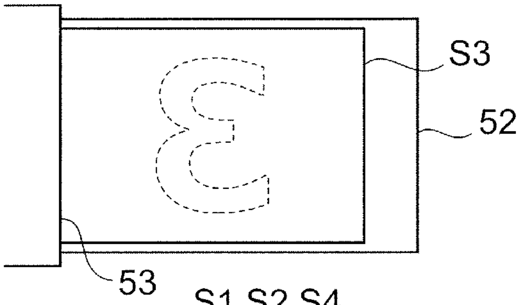
Figures 4, 5A:
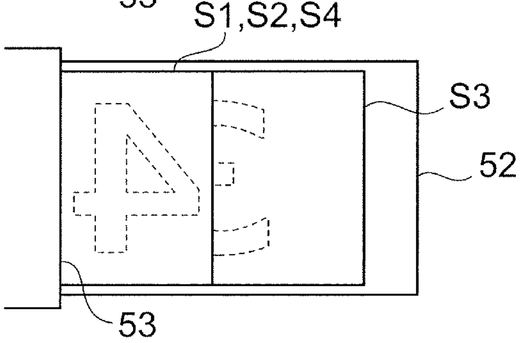
Figure 5B:
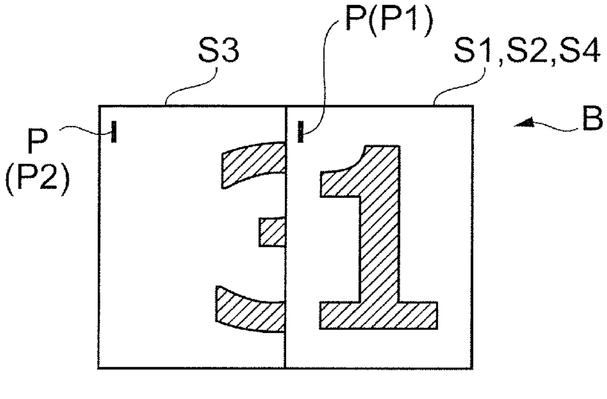
FIG. 5B shows a bundle of sheets obtained by the sheets shown in FIGS. 5A-1 to 5A-4.

FIGS. 5A-1 to 5A-4 each shows a sheet outputted onto the output sheet stacking part 52 in a related art different from the exemplary embodiment, and FIG. 5B shows a bundle of sheets B obtained by the sheets shown in FIGS. 5A-1 to 5A-4. It should be noted that FIGS. 5A-1 to 5A-4 show the sheets in a state of being viewed from above the output sheet stacking part 52, whereas FIG. 5B shows the bundle of sheets B viewed from the front surface side of the sheets, on which the images are formed.

Next, with reference to FIGS. 4A and 4B, and FIGS. 5A-1 to 5A-4 and 5B, specific description will be given of the bundle of sheets B, on each of which image formation is executed by the print data shown in FIG. 4A and which is then stacked on the output sheet stacking part 52, in a related art different from the exemplary embodiment.

First, as shown in FIG. 5A-1, the image of the first page is formed in accordance with the print data shown in FIG. 4A, and the sheet S1 is stacked on the output sheet stacking part 52. At this time, since the sheet size of the sheet S1 is A4, the output pattern is the first pattern. In addition, the sheet S1 is stacked on the output sheet stacking part 52 in the face down stacking state. Here, the sheet S1 stacked on the output sheet stacking part 52 is in a state where a trailing edge thereof in the outputting direction, in which the sheets are outputted to the output sheet stacking part 52 (refer to arrow A), is abutted against the abutting wall 53. Then, by the abutment against the abutting wall 53, when the sheet S2 (refer to FIG. 5A-2) or the like subsequent thereto is stacked, the trailing edge in the outputting direction is aligned.

Next, as shown in FIG. 5A-2, the sheet S2 of the second page is stacked on the output sheet stacking part 52. The sheet S2 has the same size (A4) as the sheet S1 (refer to FIG. 5A-1) that has already been outputted to the output sheet stacking part 52, and therefore, outputted by the first pattern, and has positional relationship of being placed on the sheet S1.

Next, as shown in FIG. 5A-3, the sheet S3 of the third page is stacked on the output sheet stacking part 52. Since the sheet size of the sheet S3 is A3, the output pattern is the second pattern. In addition, the sheet S3 is larger than the size of the sheets S1 and S2 (A4), and is placed on the sheets S1 and S2, which have already been outputted to the output sheet stacking part 52, in a state where part of the sheet S3 (leading edge side in the output direction) extends off the sheets S1 and S2.

Next, as shown in FIG. 5A-4, the sheet S4 of the fourth page is stacked on the output sheet stacking part 52. Since the sheet size of the sheet S4 is A4, the output pattern is the first pattern. In addition, the sheet S4 is smaller than the size of the sheets S3 (A3), and arranged to be placed on part of the sheet S3 (trailing edge side in the output direction), which has already been outputted to the output sheet stacking part 52.

Here, the bundle of sheets B obtained by sequentially stacked as shown in FIGS. 5A-1 to 5A-4 is in a state shown in FIG. 5B as viewed from the side of the surface on which the image is formed. In other words, in the bundle of sheets B shown in FIG. 5B, sides positioned on the right side are aligned with the orientation in which the upper side of the image is located upward. Then, the binding portion P, which should be formed at one location in nature as shown in FIG. 4B, is in a state of displacement between a binding portion P1 in the sheets S1, S2 and S4 and a binding portion P2 in the sheet S3 in the bundle of sheets B shown in FIG. 5B. In other words, the binding portions P are formed at two locations, namely, at an upper side in a center portion of longitudinal direction and at the top left corner portion in the sheet S3.

Then, a user who obtained such a bundle of sheets B is required to displace the positions of the sheets S1, S2 and S4 and the position of the sheet S3 and align the sides positioned on the left side, while facing the sheet surfaces on each of which the image is formed, for bringing the bundle of sheets B into the state shown in FIG. 4B.

Accordingly, in the exemplary embodiment, the output pattern in the sheet outputted to the output sheet stacking part 52 (output sheet) is determined for each and every page (sheet). Then, in a case where the output pattern is changed, a user is prompted to change orientation of the output sheets having already been stacked on the output sheet stacking part 52, and the output pattern subsequent thereto is determined in accordance with the orientation of the output sheets changed by the user.

To describe further, in the exemplary embodiment, in a case where the sheet size, of the factors of the output pattern, is changed, and to be specific, in a case where the sheet size is changed between A4 and A3, a user is prompted to change the orientation of the output sheets, and the default output pattern is changed to another output pattern.

In the following description, a switching mode of the output patterns in the exemplary embodiment will be described. To be specific, first, a functional configuration of the output pattern controller 77 in the exemplary embodiment will be described. Next, a switching operation in the image forming apparatus 5 will be described in detail.

<Output Pattern Controller 77>

Figure 6:
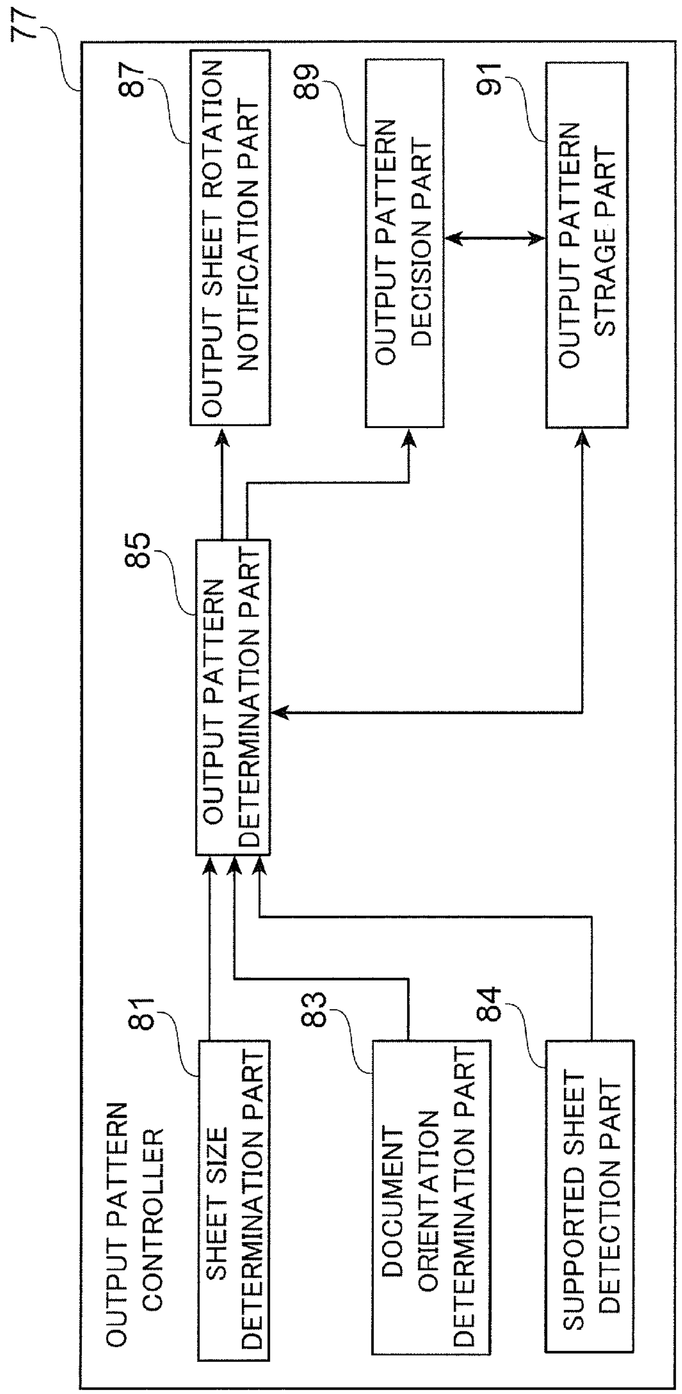
FIG. 6 is a diagram showing a functional configuration of an output pattern controller.

FIG. 6 is a diagram showing a functional configuration of the output pattern controller 77.

The output pattern controller 77 includes, as functions thereof: a sheet size determination part 81; a document orientation determination part 83; a supported sheet detection part 84; an output pattern determination part 85; an output sheet rotation notification part 87; an output pattern decision part 89; and an output pattern storage part 91.

The sheet size determination part 81 determines a sheet size for each page of the print data.

The document orientation determination part 83 determines a document orientation for each page of the print data. It should be noted that the document orientation is determined based on an orientation of an image transmitted from the terminal device 3. For example, the document orientation is determined with reference to an orientation of an image displayed on the display (not shown) of the terminal device 3. To be specific, a side in an image displayed on the upper side in the display of the terminal device 3 is recognized as the upper side in the image. It should be noted that the document orientation may be determined by other modes, of course. For example, the document orientation may be determined based on an orientation of fonts included in the print data.

The supported sheet detection part 84 detects a sheet size and a sheet placement orientation of the sheet that is stacked in the supply sheet stacking part 50 (FIG. 1) and is able to be supplied (supported sheet).

The output pattern determination part 85 determines the output pattern according to the sheet size determined by the sheet size determination part 81, the document orientation determined by the document orientation determination part 83 and the sheet size and sheet placement orientation of the supported sheet detected by the supported sheet detection part 84. Moreover, the output pattern determination part 85 stores in advance, for example, combinations of the output patterns and whether or not change of the sheet output orientation (described later) is necessary in each of the combinations. Then, based on the stored information, the output pattern determination part 85 determines whether or not change of the sheet output orientation is necessary in accordance with the output pattern determined by itself and the output patterns stored in the output pattern storage part 91.

The output sheet rotation notification part 87, as an example of a notification section, issues notification prompting a user to rotate (correct) an output sheet orientation, which is an orientation of a sheet having been outputted (output sheet), in the case where the output pattern of the sheet having been outputted is different from the output pattern of a sheet to be outputted from now on. To be specific, the output sheet rotation notification part 87 causes the UI 54 to display an output sheet rotation notification screen 541 (refer to FIG. 7D, to be described later). In addition, the output sheet rotation notification part 87 accepts a signal indicating that rotation of the output sheet is completed.

The output pattern decision part 89 decides the output pattern based on the output pattern determined by the output pattern determination part 85 or the output pattern stored in the output pattern storage part 89. Moreover, the output pattern decision part 89 decides the output pattern based on the signal from the output sheet rotation notification part 87 indicating that rotation of the output sheet is completed. Further, in accordance with the decided output pattern, the output pattern decision part 89 causes the image creation part 71 and the printing part 73 (refer to FIG. 2) to execute image formation. It should be noted that, according to the decided output pattern, the image creation part 71 rotates an orientation of an image to be formed (printing orientation) as necessary.

The output pattern storage part 91 stores the output pattern decided by the output pattern decision part 89.

<Switching Operation of Output Patterns>

FIGS. 7A to 7F are diagrams illustrating switching operation of the output patterns.

Next, with reference to FIGS. 4A and 4B, FIGS. 5A-1 to 5A-4 and 5B, and FIGS. 7A to 7F, switching operation of output patterns will be described. It should be noted that, in the example shown in FIGS. 7A to 7F, it is assumed that printing is executed in accordance with the print data shown in FIG. 4A. Moreover, the output sheets (the sheets S1 to S4) shown in FIGS. 7A to 7F are viewed from above in the vertical direction of the output sheet stacking part 52 (refer to FIG. 1). Furthermore, in FIGS. 7A to 7F, the output sheets are drawn to be displaced from one another in the vertical direction in the figures for clarification; however, it is assumed that positions of the output sheets in the vertical direction in the figures coincide with one another.

Figure 7A:
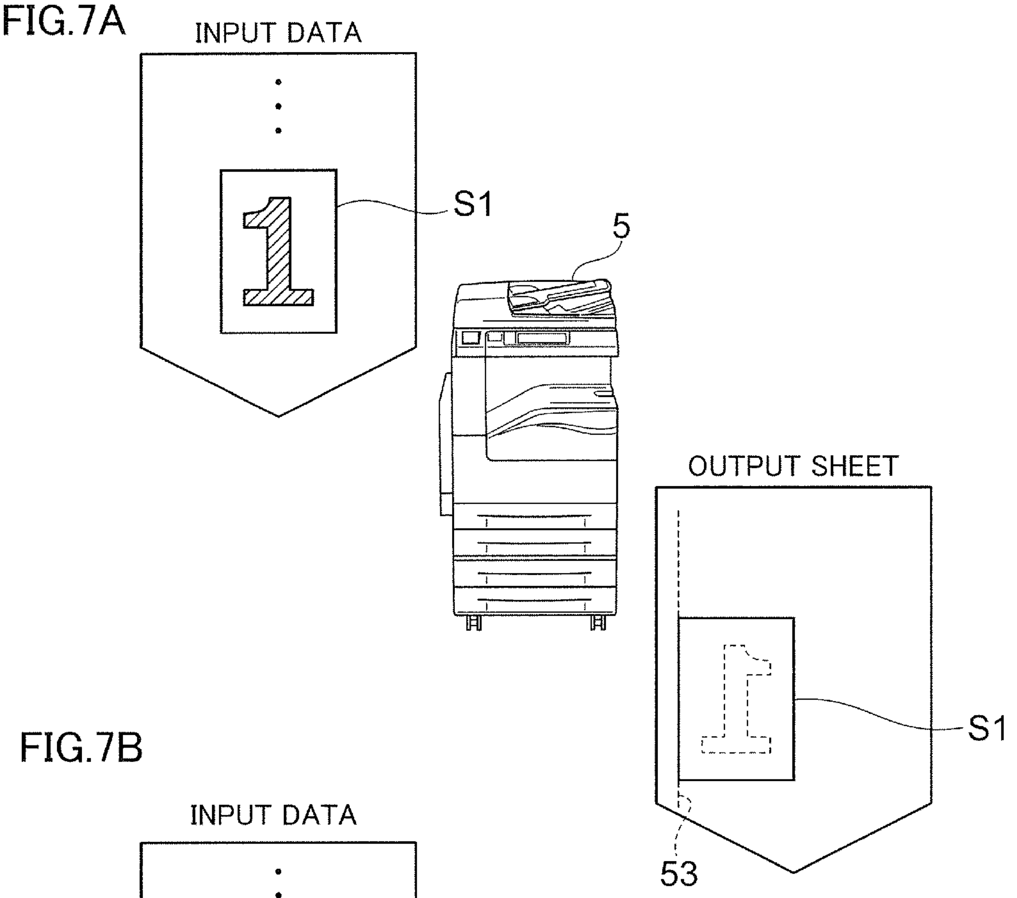
FIGS. 7A to 7F are diagrams illustrating switching operation of output patterns.

First, as shown in FIG. 7A, in the exemplary embodiment, when the image forming apparatus 5 accepts the print data of the first sheet S1, which is the first page (refer to the input data in the figure), before reception of the entire print data is completed (for example, before reception of the print data of the sheet S2 (refer to FIG. 7B) is completed), analysis of the print data is started. Then, the sheet S1, on which an image is formed, is outputted in accordance with the result of analysis (refer to the output sheet in the figure). The sheet S1 is outputted by the first pattern. In addition, the sheet S1 is in the face down stacking state and one end thereof is abutted against the abutting wall 53.

Figure 7B:
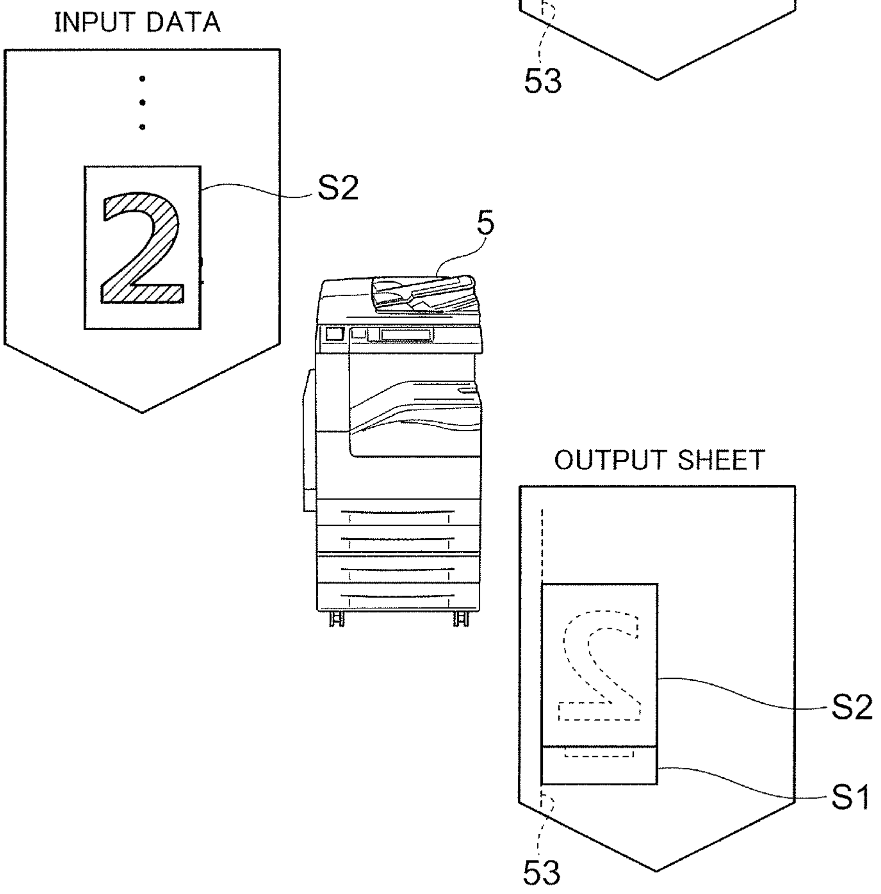

Next, as shown in FIG. 7B, when the print data of the second sheet S2 is accepted, the sheet S2, on which an image according to the print data is formed, is outputted. The sheet S2 has the same size as the sheet S1 that has already been outputted to the output sheet stacking part 52 (for example, A4 size), and outputted by the first pattern, to be stacked on the sheet S1.

Figure 7C:
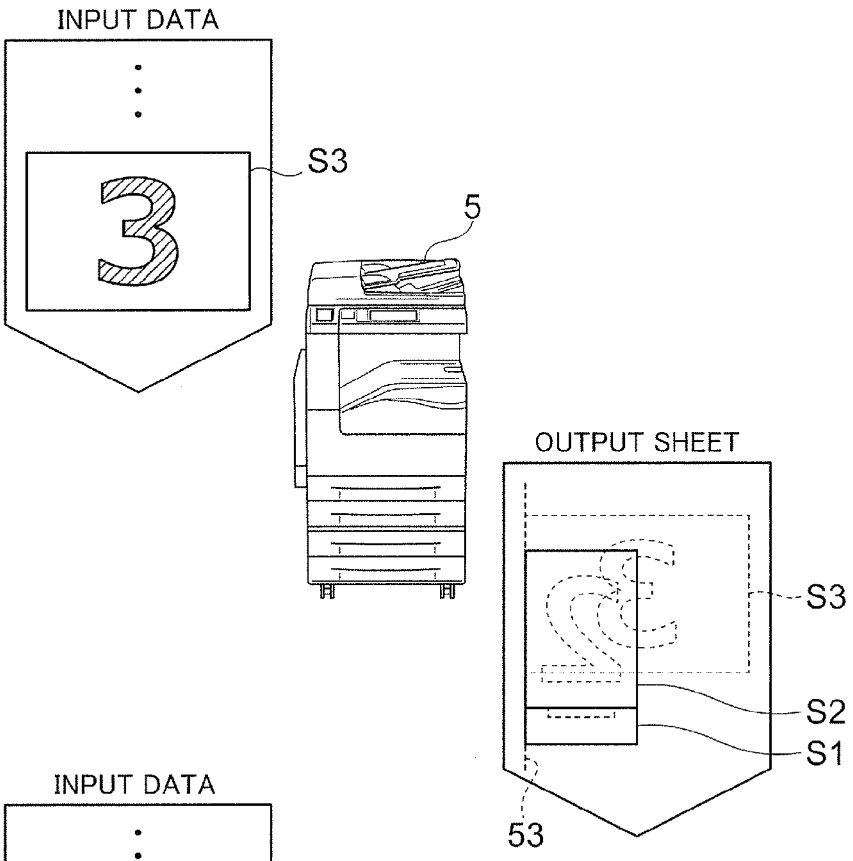

Next, as shown in FIG. 7C, the print data of the third sheet (the next sheet) S3 is accepted. Then, analysis of the print data of the sheet S3 that has been accepted is executed. By the analysis, difference in the output patterns (sheet sizes) among the sheets S1, S2 and S3 is detected. It should be noted that, if an image is formed on the sheet S3 and the sheet S3 is outputted by the default output pattern (the second output pattern, refer to the sheet S3 indicated by broken lines), the edge portions in the bundle of sheets B, which are desired to be aligned, are not aligned, as described above with reference to FIGS. 5A-1 to 5A-4 and 5B.

Figure 7D:
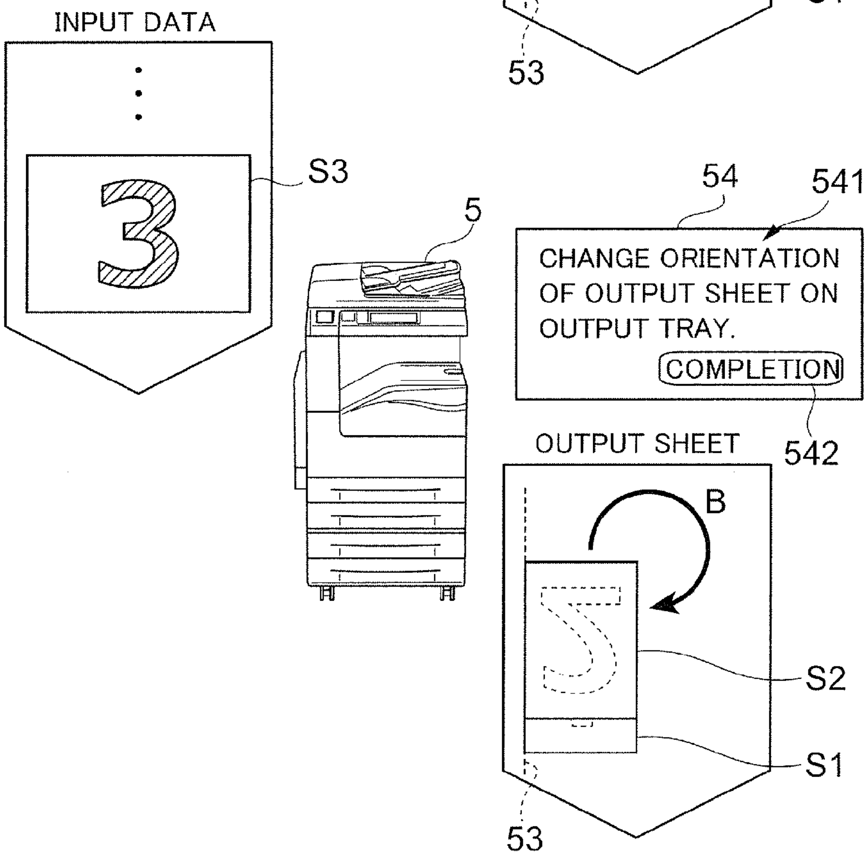

Therefore, as shown in FIG. 7D, in the exemplary embodiment, the output sheet rotation notification screen 541 that prompts the user to change (rotate) the orientation of the output sheets stacked on the output sheet stacking part 52 is displayed on the UI 54. It should be noted that the output sheet rotation notification screen 541 includes a completion button 542 that is operated by a user when rotation of the output sheets (output sheet rotation) is completed.

Then, in accordance with the output sheet rotation notification screen 541, the sheets S1 and S2 stacked on the output sheet stacking part 52 are rotated by the user (refer to arrow B in the figure). To describe further, in the example shown in the figure, as viewed by the user standing in front of the image forming apparatus 5, edge portions of the frontward side (the lower side in FIG. 7D) of the sheets S1 and S2 stacked on the output sheet stacking part 52 are replaced with edge portions of the far side (the upper side in FIG. 7D) (the sheets S1 and S2 are rotated 180 degrees), while maintaining the face down stacking state.

Figure 7E:
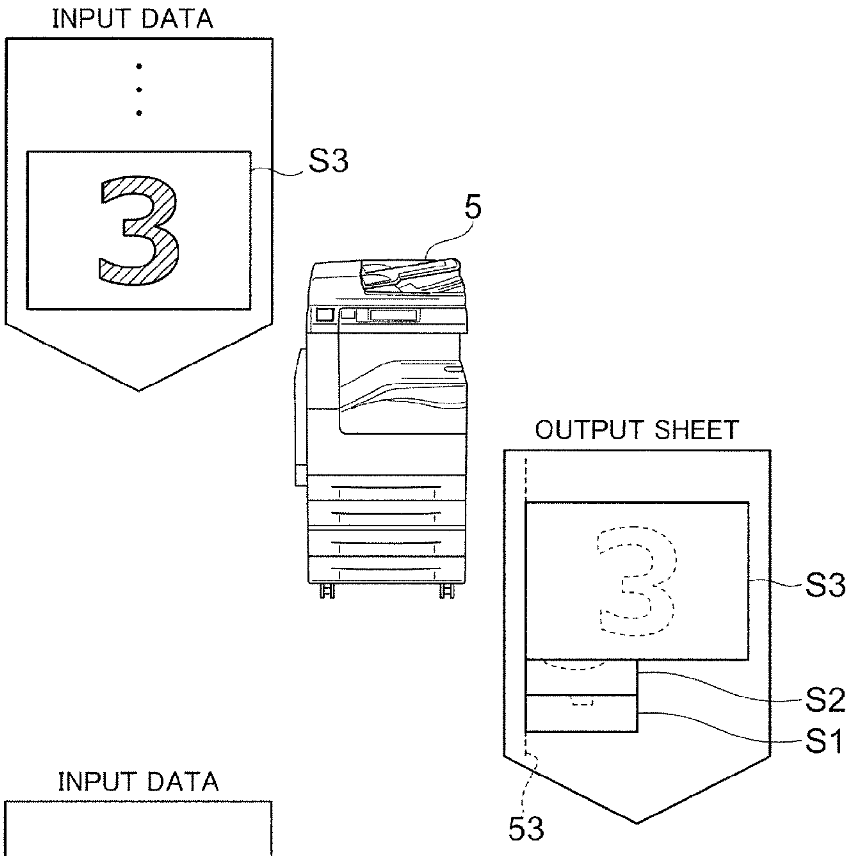

Next, as shown in FIG. 7E, on the sheets S1 and S2 whose edge portions of the frontward side and edge portions of the far side are replaced, the sheet S3 of the third page is outputted by the fourth pattern. Here, the printing orientation in the sheet S3 is different 180 degrees in angle from the orientation in the sheets S1 and S2 (normal orientation). To describe further, in the sheet S3, rasterizing orientation by the image creation part 71 is rotated 180 degrees from the orientation in the sheets S1 and S2 (normal orientation).

In addition, the sheet S3 is larger than the size of the sheets S1 and S2 (for example, A3 size), and is placed on the sheets S1 and S2, which have already been outputted to the output sheet stacking part 52, in a state where part of the sheet S3 (leading edge side in the output direction) extends off the sheets S1 and S2.

Figure 7F:
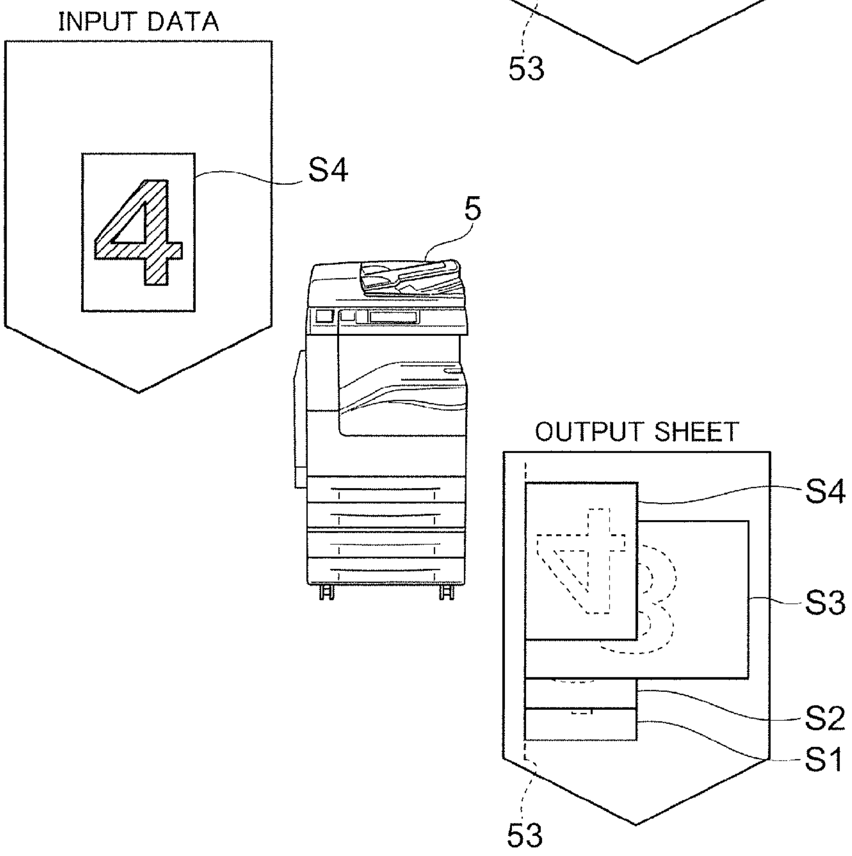

Next, as shown in FIG. 7F, when the print data of the fourth sheet S4 is accepted, the sheet S4, on which an image according to the print data is formed, is outputted. The sheet S4 has a sheet size A4, and accordingly, the sheet S4 is outputted by the first pattern in the default state. However, since the sheets S1 and S2 are rotated by the user in FIG. 7D, the sheet S4 is outputted by the third pattern. Here, printing orientation in the sheet S4 becomes the reverse orientation that coincides with the orientation of the sheet S3, which is different 180 degrees in angle from the orientation in the sheets S1 and S2 (normal orientation).

In addition, the sheet S4 is smaller than the size of the sheets S3 (for example, A4 size), and arranged to be placed on part of the sheet S3 (trailing edge side in the output direction), which has already been outputted to the output sheet stacking part 52.

The bundle of sheets B obtained by sequentially stacked as shown in FIGS. 7A to 7F is in a state shown in FIG. 4B. In other words, in the bundle of sheets B, sides positioned on the left side are aligned with the orientation in which the upper side of the image is located upward. Moreover, in the bundle of sheets B, the binding portion P in the sheets S1, S2 and S4 and the binding portion P in the sheet S3 are arranged to coincide with each other. Accordingly, the user who obtains such a bundle of sheets B is not required to align the edge portions of the bundle of sheets B again, different from the case where the bundle of sheets B shown in FIG. 5B is obtained. Consequently, for example, it becomes possible to apply a binding process on the binding portion P in the bundle of sheets B without aligning the edge portions again.

To additionally describe, the image forming apparatus 5 in the exemplary embodiment is able to perform output by a proper output pattern in the receiving side alone that receives print data. Accordingly, in the terminal device 3 (refer to FIG. 1), a special-purpose printer driver becomes unnecessary. Moreover, the image forming apparatus 5 in the exemplary embodiment is able to be applied to the case where direct printing is executed from the terminal device 3, or in the case where a general-purpose printer driver is used in the terminal device 3.

In addition, since an analyzing process of the sheet size, document orientation and the like may be successively processed from the first page, it is possible to execute the process in performance (speed) similar to an image forming apparatus with a configuration different from that of the exemplary embodiment (not shown).

<Printing Operation>

Figure 8:
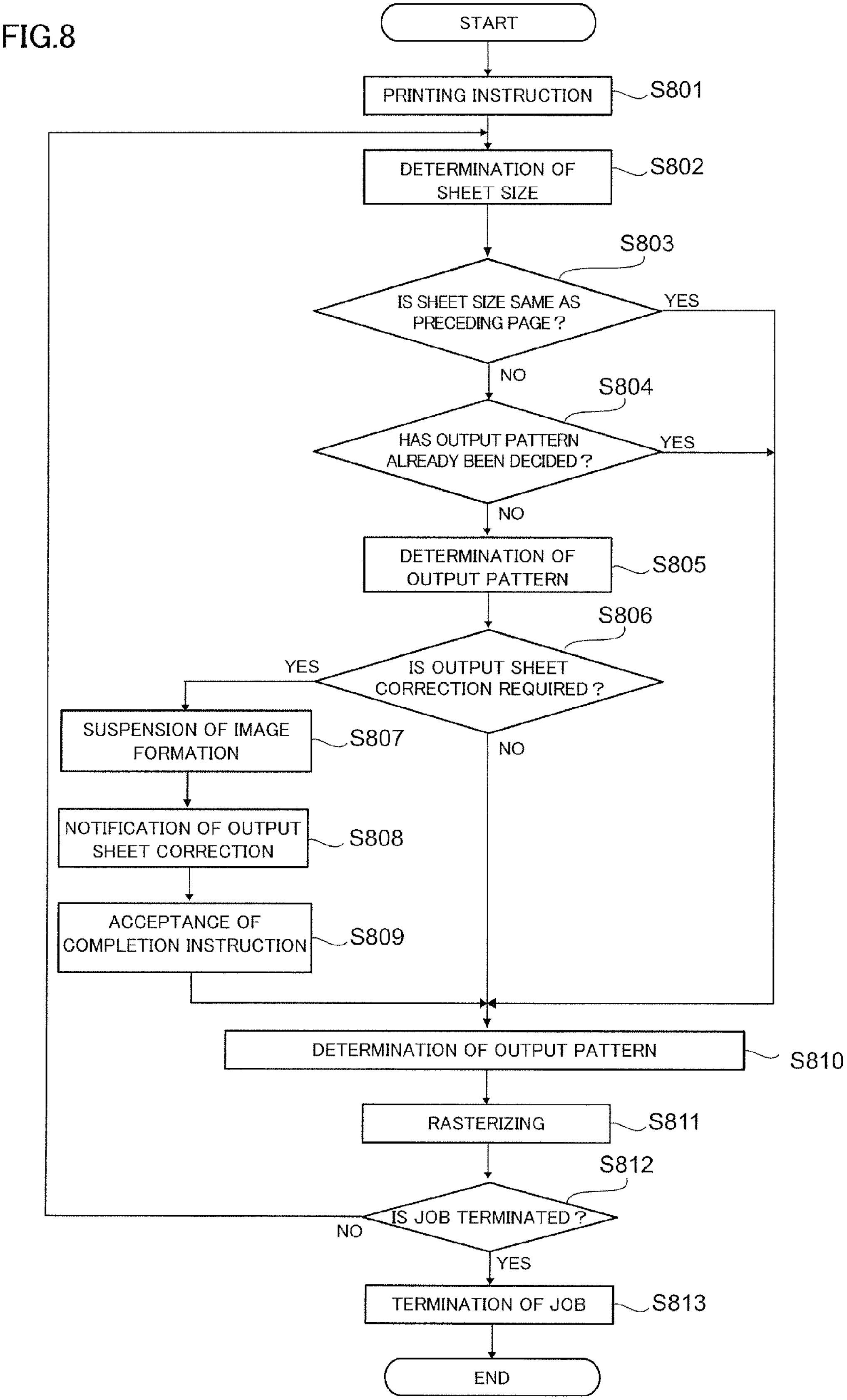
FIG. 8 is a flowchart showing an example of printing operation in an image forming apparatus.

FIG. 8 is a flowchart showing an example of printing operation in the image forming apparatus 5.

Next, with reference to FIG. 2, FIGS. 4A and 4B, FIG. 6 and FIG. 8, the printing operation of the image forming apparatus 5 will be described.

First, the job controller 67 accepts the printing instruction from the terminal device 3 (step 801). Next, the sheet size determination part 81 determines the sheet size of each page with respect to the print data in the printing instruction accepted by the job controller 67 (step 802).

Next, the sheet size determination part 81 determines whether or not a sheet size that has been determined is same as the size of a preceding page (step 803). Then, in a case where the determined sheet size is not same as the size of the preceding page (No in step 803), the output pattern determination part 85 determines whether or not the output pattern corresponding to the sheet size determined in step 802 is stored in the output pattern storage part 91, in other words, the output pattern has already been determined (step 804).

In a case where the output pattern has not been determined (No in step 804), the output pattern determination part 85 determines the output pattern according to the sheet size determined in step 802, the document orientation determined by the document orientation determination part 83 (refer to FIG. 6) and the supported sheet detected by the supported sheet detection part 84 (refer to FIG. 6) (step 805).

Then, based on the output pattern determined in step 85 and the output pattern stored in the output pattern storage part 91, the output pattern determination part 85 determines whether or not change of the sheet output orientation is necessary (step 806).

In the case where change of sheet output orientation is necessary (Yes in step 806), the image creation part 71 suspends analysis of the print data (suspends image forming operation) (step 807). Then, the output sheet rotation notification part 87 displays the output sheet rotation notification screen 541 on the UI 54 (refer to FIG. 7D) (step 808). Thereafter, by operation of the completion button 542 (refer to FIG. 7D) by the user, the output sheet rotation notification part 87 accepts the signal indicating that rotation of the output sheet is completed (step 809).

When the output sheet rotation notification part 87 accepts the signal, the output pattern decision part 89 decides that the output pattern determined in step 806 is the output pattern of the page (step 810). At this time, the output pattern storage part 91 stores the output pattern of the page.

On the other hand, in a case where the determined sheet size is same as the size of the preceding page (Yes in step 803), the output pattern decision part 89 decides that the output pattern same as that of the preceding page is the output pattern of the page (step 810). Moreover, in the case where the output pattern has already been determined (Yes in step 804), the output pattern decision part 89 decides that the output pattern stored in the output pattern storage part 91 is the output pattern of the page (step 810). Or, in the case where change of the sheet output orientation is unnecessary (No in step 806), the output pattern decision part 89 decides that the output pattern determined in step 805 is the output pattern of the page (step 810).

Then, in accordance with the decided output pattern, the image creation part 71 performs rasterizing (step 811). According to the rasterized print data, an image is formed on a sheet by the printing part 73.

Next, the sheet size determination part 81 determines whether or not the job of the accepted printing instruction is completed, in other words, there exists a next page in the printing instruction (step 812).

In the case where the job is not completed (No in step 812), the sheet size determination part 81 determines the sheet size of the next page (step 802).

On the other hand, in the case where it is determined that the job is completed (Yes in step 812), the job controller 67 terminates the job executed by the image forming apparatus 5 (step 813).

It should be noted that, in the above description, it is explained that change of the output pattern is determined based on the change of the sheet size detected by the sheet size determination part 81. However, as described above, the output pattern is decided by, factors other than the sheet size, such as sheet output orientation or printing orientation. Accordingly, instead of the fact that the sheet size detected by the sheet size determination part 81 is changed, the output pattern may be decided based on the fact that, for example, the document orientation determined by the document orientation determination part 83 is changed. Moreover, the output pattern may be decided based on the fact that the printing orientation of each page determined by the printing orientation determination part (not shown), which is included in the output pattern controller 77 as a function thereof, is changed. Further, the output pattern may be decided based on the fact that part or all of the sheet size detected by the sheet size determination part 81, the document orientation detected by the document orientation determination part 83, the printing orientation detected by the printing orientation determination part or other factors, such as the sheet type, are combined, and any of them is changed.

It should be noted that the sheet size determination part 81 is able to be captured as a mechanism for detecting a print execution condition for executing printing.

Second Exemplary Embodiment

Figure 9:
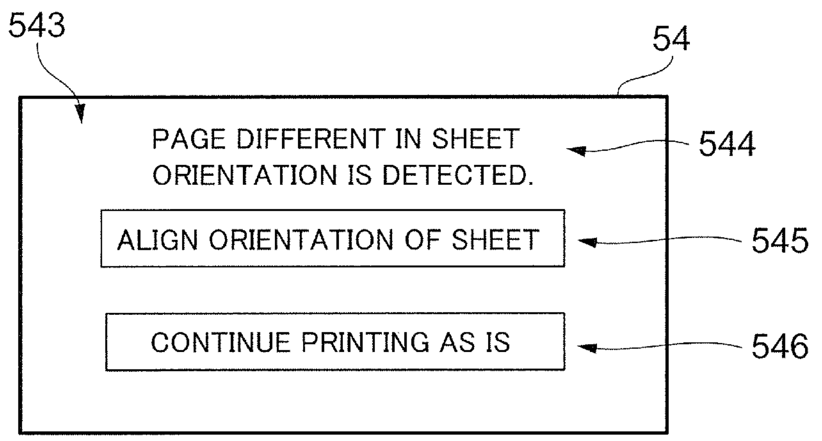
FIG. 9 is a diagram showing a sheet orientation notification screen in a second exemplary embodiment.
Figure 10:
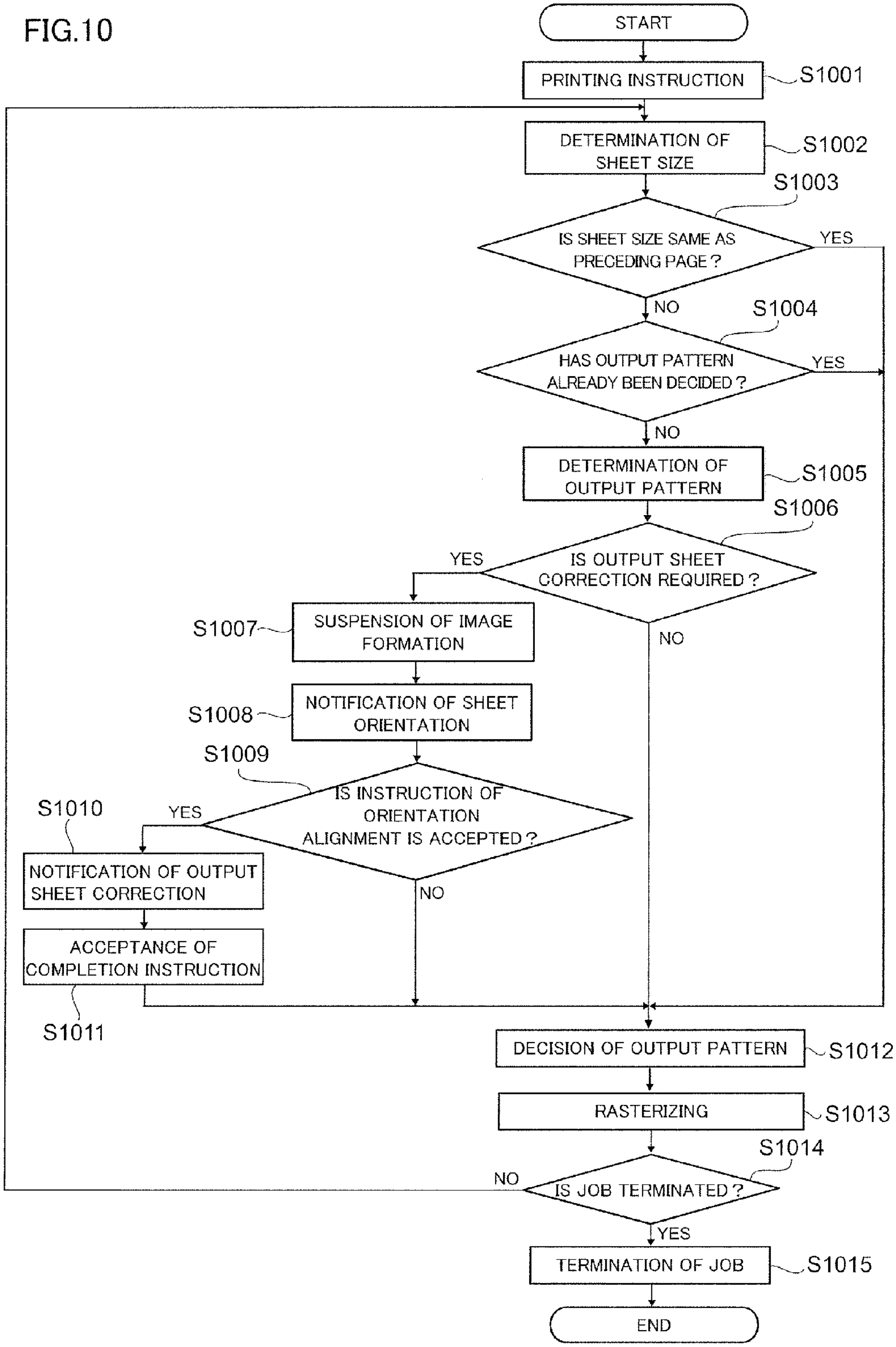
FIG. 10 is a flowchart showing an example of printing operation in the second exemplary embodiment.

FIG. 9 is a diagram showing a sheet orientation notification screen 543 in a second exemplary embodiment. FIG. 10 is a flowchart showing an example of printing operation in the second exemplary embodiment.

In the above-described exemplary embodiment, decision of the output pattern, made with the acceptance of the signal, which indicates that rotation of the output sheet orientation by the user is completed, by the output sheet rotation notification part 87 (refer to step 809 in FIG. 8) as an impetus, is described. However, a case where, for example, a user does not want to work for rotating the output sheets is also assumed. In other words, there is a case in which a user gives a higher priority to continuation of image forming operation than the work for rotating the output sheet orientation.

Accordingly, in the image forming apparatus 5 in the exemplary embodiment, a function causing a user to select a case where the output pattern is changed while rotating the orientation of the output sheets or a case where the output pattern is maintained without rotating the orientation of the output sheets is provided.

First, with reference to FIG. 9, the sheet orientation notification screen 543 displayed on the UI 54 in the exemplary embodiment will be described.

The sheet orientation notification screen 543 includes a detection notification image 544 that notifies a user of detection of a page that is different in the output pattern (orientation of a sheet), a first button 545 that is operated (selected) by a user when the output pattern is changed and then image formation is executed, and a second button 546 that is operated by a user when the output pattern is maintained and image formation is continued. It should be noted that, in the example shown in the figure, the first button 545 indicates that "orientations of sheets are aligned" in a bundle of sheets to be formed, and the second button 546 indicates that "printing is executed without changing" with no change being made in the output pattern.

Next, with reference to FIG. 10, the printing operation of the image forming apparatus 5 in the exemplary embodiment will be specifically described. It should be noted that, since steps 1001 to 1007 and steps 1012 to 1015 in FIG. 10 are similar to the process in steps 801 to 807 and steps 810 to 813 in FIG. 8, respectively, description thereof will be omitted here.

First, when the image creation part 71 suspends analysis of the print data (step 1007), the output sheet rotation notification part 87 displays the sheet orientation notification screen 543 on the UI 54 (refer to FIG. 9) (step 1008). Thereafter, by operation of the first button 545 by the user, the output sheet rotation notification part 87 determines whether or not to accept the signal that instructs change of the output pattern (step 1009).

Then, in a case where the output sheet rotation notification part 87 accepts the signal that instructs change of the output pattern (Yes in step 1009), the output sheet rotation notification part 87 displays the output sheet rotation notification screen 541 on the UI 54 (refer to FIG. 7D) (step 1010). Thereafter, by operation of the completion button 542 (refer to FIG. 7D) by the user, the output sheet rotation notification part 87 accepts the signal indicating that rotation of the output sheet is completed (step 1011). When the output sheet rotation notification part 87 accepts this signal, the output pattern decision part 89 decides that the output pattern determined in step 806 is the output pattern of the page (step 1012).

On the other hand, in a case where the output sheet rotation notification part 87 does not accept the signal that instructs change of the output pattern (No in step 1009), in other words, in a case where a user operates the second button 546, the output pattern decision part 89 decides that the default output pattern is the output pattern of the page (step 1012), and image formation is continued.

By the way, in the case where the user operate the second button 456, sheets outputted by continuing image formation (subsequent sheets) are stacked on the sheets previously outputted (preceding sheets) on the output sheet stacking part 52 (refer to FIG. 1). Therefore, a process for facilitating to draw a distinction between the subsequent sheets and the preceding sheets may be applied. In other words, there may be a configuration in which positions of the preceding sheets and the subsequent sheets are displaced in the direction orthogonal to the transport direction on the output sheet stacking part 52 (offset outputting), or a configuration in which the subsequent sheets are outputted onto another stacking part (not shown), which is different from the output sheet stacking part 52.

Moreover, in the above description, it is explained that, by operating the sheet orientation notification screen 543, the output sheet rotation notification screen 541 (refer to FIG. 7D) is displayed and the completion button 542 included in the output sheet rotation notification screen 541 is operated by a user; however, the operation is not limited thereto. In other words, by including the completion button 542 into the sheet orientation notification screen 543, there may be a configuration in which an instruction from a user is accepted on one screen in the sheet orientation notification screen 543.

Third Exemplary Embodiment

Figure 11:
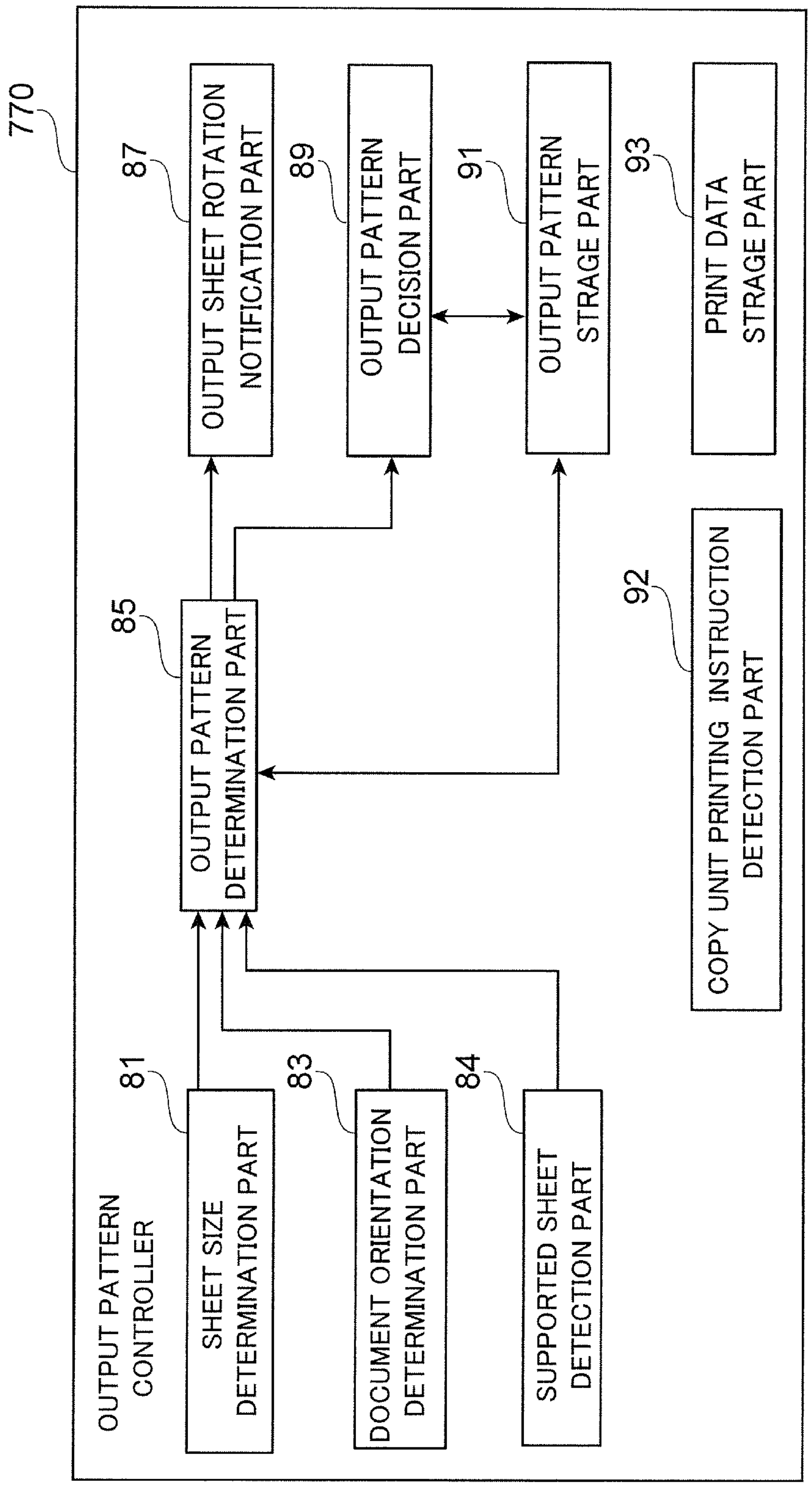
FIG. 11 is a diagram showing a functional configuration of an output pattern controller in a third exemplary embodiment.
Figure 12:
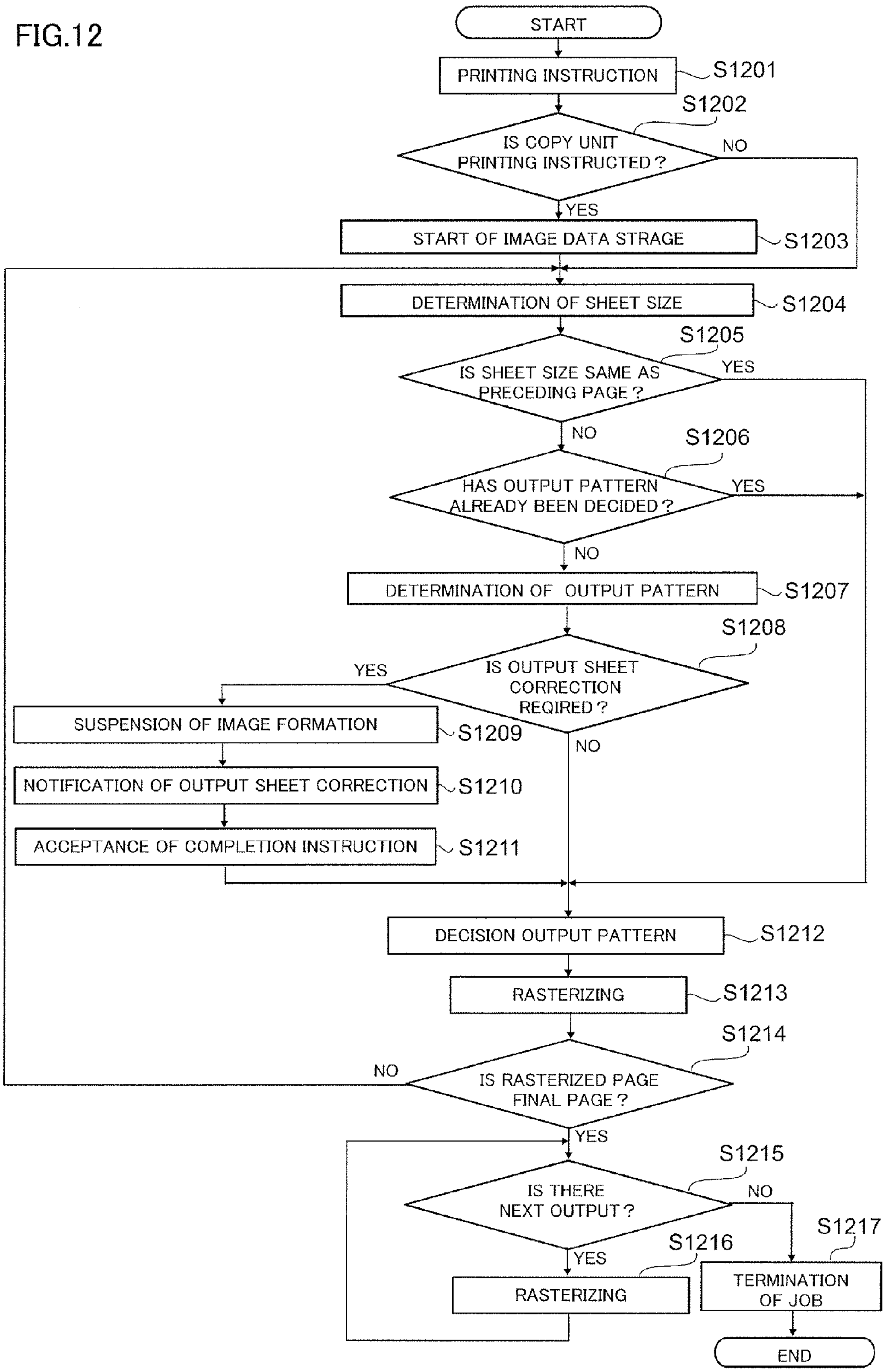
FIG. 12 is a flowchart showing an example of printing operation in the third exemplary embodiment.

FIG. 11 is a diagram showing a functional configuration of an output pattern controller 770 in a third exemplary embodiment. Moreover, FIG. 12 is a flowchart showing an example of printing operation in the third exemplary embodiment.

Incidentally, depending on printing instructions, in a job for forming a bundle of mixed-size sheets, there are some cases in which a collating (copy unit printing) instruction of multiple copies is provided. In other words, multiple copies of the same bundle of sheets are outputted in some cases.

On the other hand, in the case where the copy unit printing instruction is provided, if the printing operation in the above-described exemplary embodiments is repeated, a user is required to rotate the output sheet orientation every time the image forming apparatus 5 outputs a page of a different output pattern.

Accordingly, in this exemplary embodiment, in a case where the printing instruction to output multiple copies of the same bundle of sheets is received and when second and subsequent copies of the bundle of sheets are formed, the work for rotating the output sheet orientation by a user is eliminated.

First, with reference to FIG. 11, the output pattern controller 770 in the exemplary embodiment will be described. It should be noted that, constituents same as those in the output pattern controller 77 shown in the above-described FIG. 6 are assigned with the same reference signs, and thereby description hereinafter will be omitted.

As shown in FIG. 11, the output pattern controller 770 includes a copy unit printing instruction detection part 92 and a print data storage part 93.

Here, the copy unit printing instruction detection part 92 detects that the copy unit printing instruction is included in the printing instruction accepted by the image forming apparatus 5. It should be noted that, here, the description will be given on the assumption that the copy unit printing instruction is included in a head portion of the printing instruction.

The print data storage part 93, which is an example of a storage section, holds the print data of all pages in one bundle of sheets. It should be noted that the information stored in the print data storage part 93 is the print data included in the printing instruction accepted by the image forming apparatus 5, and is the data before being rasterized by the image creation part 71.

Next, with reference to FIG. 12, the printing operation of the image forming apparatus 5 in the exemplary embodiment will be specifically described. It should be noted that, since steps 1204 to 1213 in FIG. 12 are similar to the process in steps 802 to 811 in FIG. 8, respectively, description thereof will be omitted here.

First, in the exemplary embodiment, the job controller 67 accepts the printing instruction from the terminal device 3 (step 1201). Next, the copy unit printing instruction detection part 92 determines whether or not the copy unit printing instruction is included in the printing instruction (step 1202).

Then, in a case where the copy unit printing instruction detection part 92 detects the copy unit printing instruction (Yes in step 1202), the print data storage part 93 starts to store the print data in each page. Thereafter, the sheet size determination part 81 determines the sheet size of each page with respect to the print data in the printing instruction accepted by the job controller 67 (step 1204). On the other hand, in a case where the copy unit printing instruction detection part 92 does not detect the copy unit printing instruction (No in step 1202), the sheet size determination part 81 determines the sheet size of each page (step 1204).

Moreover, in the exemplary embodiment, after the image creation part 71 performs rasterizing in accordance with the decided output pattern (step 1213), the sheet size determination part 81 determines whether or not the rasterized page is the final page in the bundle of sheets (unit copies) (step 1214). Then, in the case where it is determined that the rasterized page is not the final page (No in step 1214), the sheet size determination part 81 determines the sheet size of the next page (step 1204).

On the other hand, in a case where it is determined that the rasterized page is the final page (Yes in step 1214), the sheet size determination part 81 determines whether or not the next bundle of sheets to be outputted exists (step 1215).

Then, in a case where there is the next bundle of sheets (Yes in step 1215), rasterizing is performed in accordance with the print data of each page stored in the print data storage part 93 and the output pattern decided by the output pattern decision part 89 in step 1212 (step 1216). After the printing part 73 prints all of the pages in the bundle of sheets in accordance with the rasterized print data, the sheet size determination part 81 determines whether or not the next bundle of sheets to be outputted exists (step 1215).

On the other hand, in the case where there is no next bundle of sheets (No in step 1215), the job controller 67 terminates the job executed by the image forming apparatus 5 (step 1217).

It should be noted that, here, it is explained that the print data storage part 93 holds the print data of all pages; however, print data storage is not limited thereto. With respect to the second and subsequent copies, in order to perform outputting in the proper output pattern and character printing orientation from the first sheet, there may be a configuration in which, for example, the print data storage part 93 holds the print data of the pages that precedes a page with which the output pattern is changed in the first copy processing, namely, the pages in which erroneous rasterizing is carried out.

Fourth and Fifth Exemplary Embodiments

Figures 1, 2, 3, 13A, 13B:
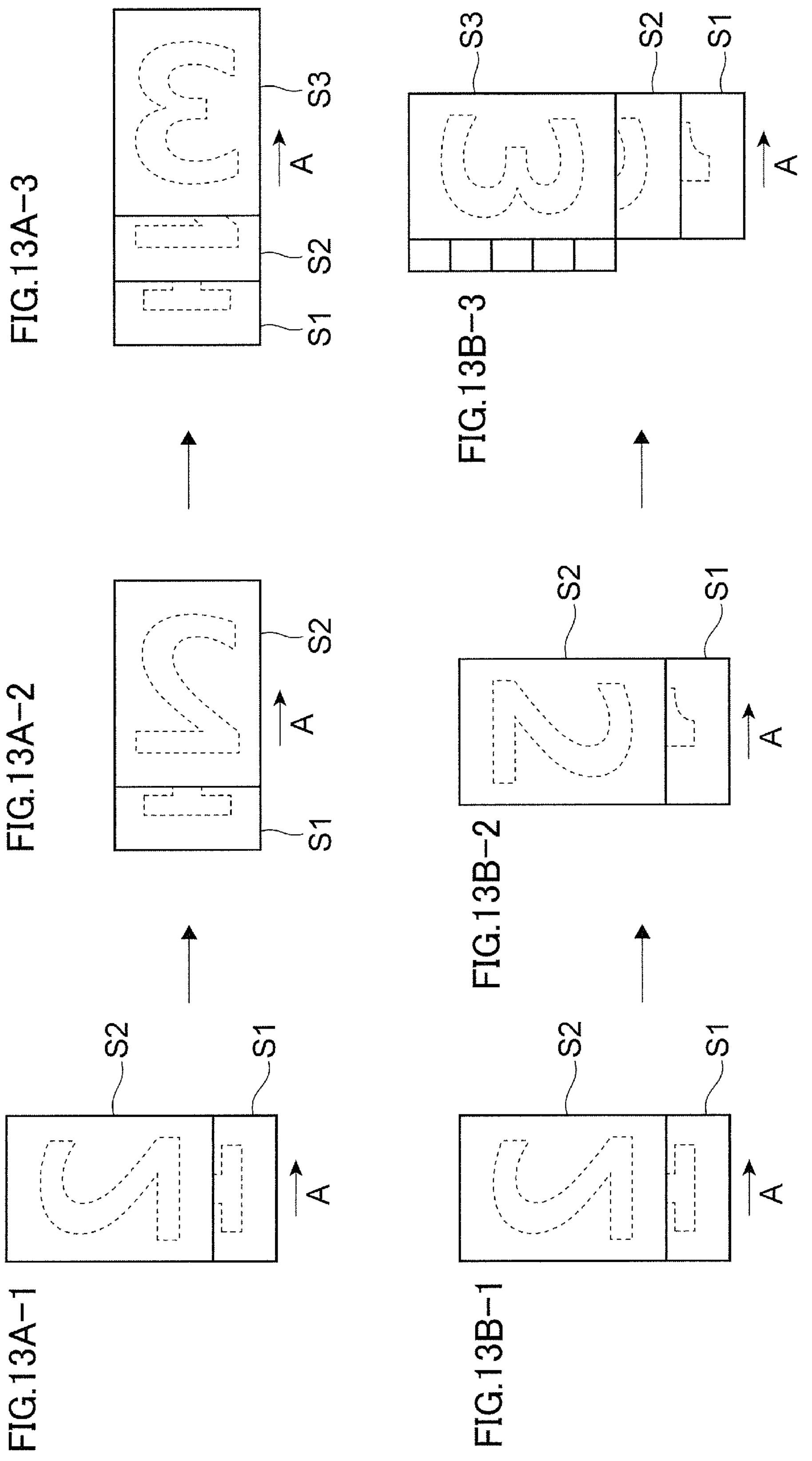

FIGS. 13A-1 to 13A-3 show states of sheets in a fourth exemplary embodiment, and FIGS. 13B-1 to 13B-3 show states of sheets in a fifth exemplary embodiment. It should be noted that FIGS. 13A-1 to 13A-3 and FIGS. 13B-1 to 13B-3 are diagrams in which sheets stacked on the output sheet stacking part 52 (refer to FIG. 1) are viewed from above in the vertical direction.

By the way, in the above description, a case of A3 sheet size as a sheet on which limitation in sheet output orientation is imposed is explained. However, a mode in which limitation in the sheet output orientation is imposed is not limited to the sheet size.

For example, as shown in FIGS. 13A-1 to 13A-3, there is a case in which the sheet output orientation is changed on a mandatory basis due to running out of sheets, and as a result, the sheet output orientation is limited.

First, to describe the print data for executing printing with reference to FIGS. 13A-1 to 13A-3, the image “1” is formed on the first sheet S1, the image “2” is formed on the second sheet S2, and the image “3” is formed on the third sheet S3. Moreover, the sheet size of the sheets S1, S2 and S3 is A4, and the document orientation in the sheets S1, S2 and S3 is the portrait-orientation document.

Moreover, description will be given of a case in which, whereas the first sheet S1 and the second sheet S2 are subjected to long-side sheet output, in forming an image on the third sheet S3, the sheet able to be subjected to long-side sheet output runs out and only the sheets able to be subjected to short-side sheet output can be supplied.

First, as shown in FIG. 13A-1, the first sheet S1 and the second sheet S2 are stacked onto the output sheet stacking part 52 (refer to FIG. 1) by long-side sheet output.

Then, since sheets able to be subjected to long-side sheet output run out in forming an image on the third sheet S3, it is required to change the sheet output orientation (output pattern). In this case, the image creation part 71 suspends analysis of the print data, and the output sheet rotation notification part 87 displays the output sheet rotation notification screen 541 (refer to FIG. 7D).

Then, as shown in FIG. 13A-2, in accordance with the display of the output sheet rotation notification screen 541, a user rotates the orientation of the output sheets. The user rotates the sheets S1 and S2, which are stacked on the output sheet stacking part 52, 90 degrees, while maintaining the face down stacking state.

Next, as shown in FIG. 13A-3, on the sheets S1 and S2 rotated 90 degrees, the third sheet S3 subjected to short-side sheet output is stacked. Here, the character printing orientation in the sheet S3 is different 90 degrees from the printing orientation in forming images on the sheets S1 and S2. To describe further, in the sheet S3, the orientation of the image rasterized and created by the image creation part 71 is rotated 90 degrees from the orientation in the sheets S1 and S2.

This provides a state in which the bundle of sheets (sheets S1, S2 and S3) with aligned image orientations is stacked.

Moreover, as shown in FIG. 13B-1 to 13B-3, as the sheet with which the sheet output orientation is limited, for example, there is a tab sheet, which is a sheet including a tab (index).

First, to describe the print data for executing printing with reference to FIGS. 13B-1 to 13B-3, the image "1" is formed on the first sheet S1, the image "2" is formed on the second sheet S2, and the image "3" is formed on the third sheet S3. Moreover, the sheet size of the sheets S1, S2 and S3 is A4, and the orientation of image in the sheets S1, S2 and S3 is the portrait-orientation document.

Here, whereas the sheets S1 and S2 are plain paper, the sheet S3 is a tab sheet. The tab sheet needs to be transported with a side of the sheet S3, on which a tab is provided, being set as a trailing edge in the sheet output direction (a side of the sheet S3 opposite to the tab being set as a leading edge in the sheet output direction) to prevent the tab from being folded when the tab sheet is transported on the transport path, for example.

Then, as shown in FIG. 13B-1, the first sheet S1 and the second sheet S2, which are plain paper, are stacked onto the output sheet stacking part 52 (refer to FIG. 1).

Then, when an image is formed on the third sheet S3, since the third sheet S3 is a tab sheet, it is required to change the sheet output orientation. In this case, the image creation part 71 suspends analysis of the print data, and the output sheet rotation notification part 87 displays the output sheet rotation notification screen 541 (refer to FIG. 7D).

Then, as shown in FIG. 13B-2, in accordance with the display of the output sheet rotation notification screen 541, a user rotates the orientation of the output sheets. The user rotates the sheets S1 and S2, which are stacked on the output sheet stacking part 52, 180 degrees, while maintaining the face down stacking state.

Next, as shown in FIG. 13B-3, on the sheets S1 and S2 rotated 180 degrees, the third sheet S3 is stacked while the side of the third sheet S3 provided with a tab is arranged on the trailing edge side in the sheet output direction. Here, the printing orientation in the sheet S3 is different 180 degrees from the printing orientation in the sheets S1 and S2. To describe further, in the sheet S3, the orientation of the image rasterized and created by the image creation part 71 is rotated 180 degrees from the orientation of images formed in the sheets S1 and S2.

This provides a state in which the bundle of sheets (sheets S1, S2 and S3) with aligned image orientations is stacked.

<Others>

By the way, though description has been omitted so far, it may be possible, in the output sheet rotation notification screen 541 that prompts to change the output sheet orientation, to display a screen indicating which orientation the preceding sheets on the output sheet stacking part 52 are to be rotated. To be specific, display of an image indicating the preceding sheets, an arrow indicating the rotating direction and the like is exemplified. Displaying the direction to which the preceding sheets are rotated as an image makes it easy for the user to do the work of rotating the preceding sheets.

Moreover, of course, notification to the user may be issued in a mode other than the display of the output sheet rotation notification screen 541, such as generating a voice that prompts to change the output sheet orientation.

By the way, in the above description, it is explained that the image forming apparatus 5 analyzes the print data and performs successive printing. However, there may be a configuration, of course, in which the image forming apparatus 5 executes the analysis of the print data in advance.

To describe specifically, for example, in a case where the image forming apparatus 5 has a configuration capable of performing analysis of the print data and formation of a print image from the print data (decompression of the print data) at the same time, it is possible to perform analysis of the print data in advance while printing is executed. Then, as a result of the analysis in advance, if it is determined that, in the sheets subjected to printing from now on, there is a sheet that requires to be rotated, for example, rotation is needed by a sheet appearing after four sheets, notification to the effect thereof may be generated to a user in advance.

Moreover, a case can be considered, in which, as in so-called reservation printing, the terminal device 3 transmits the print data to the image forming apparatus 5 in advance, namely, before the timing of printing execution by the image forming apparatus 5, and thereby the image forming apparatus 5 is capable of performing analysis of the print data. In this case, the configuration may be such that the analysis of the print job is performed at some midpoint (for example, up to the page that requires rotation), and notification to the effect that "a sheet that requires rotation is included" is issued to the user when printing is started.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image forming section that receives print data and forms an image on a sheet;

a stacking section that stacks the sheet on which the image is formed by the image forming section; and a notification section that issues notification prompting the user to change orientation of the sheet stacked on the stacking section in the case where an output mode, by which the sheet with the image formed thereon by the image forming section is outputted onto the stacking section, is changed between the sheet and a next sheet, wherein the notification section determines a change of the output mode based on any one of a sheet output orientation that is an orientation in outputting the sheet, on which the image is formed, onto the stacking section and a printing orientation that is an orientation in forming the image on the sheet.

2. An image forming apparatus comprising:

an image forming section that receives print data and forms an image on a sheet;

a stacking section that stacks the sheet on which the image is formed by the image forming section; and a notification section that issues notification to a user in a case where an output mode, by which the sheet with the image formed thereon by the image forming section is outputted onto the stacking section, is changed between a sheet and a next sheet.

3. The image forming apparatus according to claim 2, further comprising:

a suspension unit that suspends image formation by the image forming section in the case where the output mode is changed.

4. The image forming apparatus according to claim 2, wherein, in the case where the output mode is changed, the notification section issues notification prompting the user to change orientation of a sheet stacked on the stacking section.

5. The image forming apparatus according to claim 2, wherein, in a case where the print data is print data of multiple pages, the image forming section starts image formation before receiving all of the print data of the multiple pages.

6. The image forming apparatus according to claim 2, wherein the notification section determines the change of the output mode based on at least one of: a sheet size of a sheet on which an image is formed; a sheet output orientation that is an orientation in outputting a sheet, on which an image is formed, onto the stacking section; and a printing orientation that is an orientation in forming an image on a sheet.

7. The image forming apparatus according to claim 2, further comprising:

an image data creation section that analyzes the print data received by the image forming section to create data of an image to be formed by the image forming section; and a storage section that stores the print data before being analyzed by the image data creation section, in a case where multiple copies of a bundle of sheets including multiple pages are outputted in accordance with the print data.

8. A non-transitory computer readable medium storing a program that causes a computer to execute a process comprising:

receiving print data and forming an image on a sheet;

outputting and stacking the sheet on which the image is formed; and issuing notification prompting the user to change orientation of the stacked sheet in the case where an output mode, by which the sheet with the image formed thereon is outputted, is changed between the sheet and a next sheet, wherein issuing notification determines a change of the output mode based on any one of a sheet output orientation that is an orientation in outputting the sheet, on which the image is formed, and a printing orientation that is an orientation in forming the image on the sheet.

* * * * *